(12) United States Patent
Sasaki

(10) Patent No.: US 8,154,784 B2
(45) Date of Patent: Apr. 10, 2012

(54) OPTICAL SCANNING DEVICE AND IMAGE FORMING APPARATUS

(75) Inventor: Kohki Sasaki, Iwate (JP)

(73) Assignee: Ricoh Company, Ltd., Toyko (JP)

( * ) Notice: Subject to any disclaimer, the term of this patent is extended or adjusted under 35 U.S.C. 154(b) by 281 days.

(21) Appl. No.: 12/671,152

(22) PCT Filed: Sep. 5, 2008

(86) PCT No.: PCT/JP2008/066490
§ 371 (c)(1),
(2), (4) Date: Jan. 28, 2010

(87) PCT Pub. No.: WO2009/035064
PCT Pub. Date: Mar. 19, 2009

(65) Prior Publication Data
US 2010/0195181 A1    Aug. 5, 2010

(30) Foreign Application Priority Data
Sep. 12, 2007   (JP) .................................. 2007-236274

(51) Int. Cl.
G02B 26/08 (2006.01)
(52) U.S. Cl. .................................................. 359/213.1
(58) Field of Classification Search .... 359/212.1–214.1, 359/223.1–226.1
See application file for complete search history.

(56) References Cited

U.S. PATENT DOCUMENTS
2003/0021497 A1 * 1/2003 Kandori et al. ............... 382/323
2006/0243886 A1   11/2006 Nomura et al.

FOREIGN PATENT DOCUMENTS

| JP | 5 224751 | 9/1993 |
|---|---|---|
| JP | 7 181415 | 7/1995 |
| JP | 8 211320 | 8/1996 |
| JP | 9 68666 | 3/1997 |
| JP | 3006178 | 11/1999 |
| JP | 3011144 | 12/1999 |
| JP | 2000 162538 | 6/2000 |
| JP | 2002 78368 | 3/2002 |
| JP | 2002 116403 | 4/2002 |
| JP | 2003 241120 | 8/2003 |
| JP | 3543473 | 4/2004 |
| JP | 3584595 | 8/2004 |
| JP | 2005 10320 | 1/2005 |
| JP | 2005 46958 | 2/2005 |
| JP | 2005 208460 | 8/2005 |
| JP | 2006 305969 | 11/2006 |
| JP | 2007 185786 | 7/2007 |

* cited by examiner

Primary Examiner — Euncha Cherry
(74) Attorney, Agent, or Firm — Oblon, Spivak,McClelland, Maier & Neustadt, L.L.P.

(57) ABSTRACT

A disclosed optical scanning device includes a light beam generating unit configured to generate a light beam; a light beam deflecting unit configured to receive the light beam and deflect/emit the light beam with a deflecting mirror; a light beam ON/OFF control unit configured to control the light beam generating unit so that the light beam deflected by the light beam deflecting unit is turned ON/OFF in a particular light beam scanning region while the light beam is being reciprocally scanned; and a light beam scanning time measuring unit configured to obtain a measurement value by measuring a time at which the light beam passes a reference point provided on an edge part of the entire light beam scanning region that is away from a center part of the entire light beam scanning region. Timings at which the light beam is turned ON/OFF are controlled in accordance with the measurement value.

12 Claims, 15 Drawing Sheets

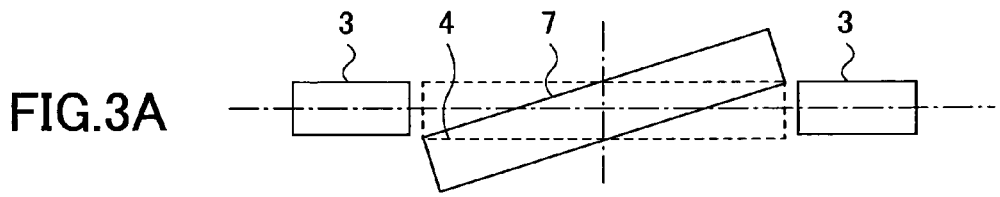
FIG.3A
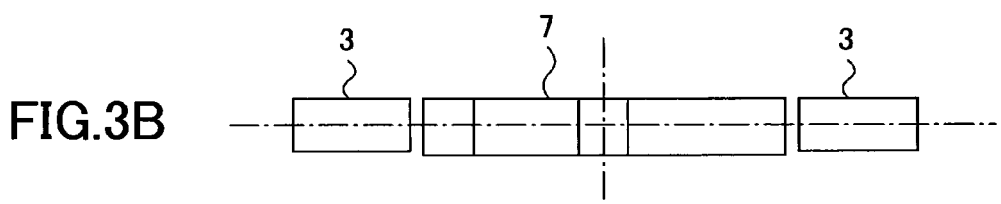
FIG.3B
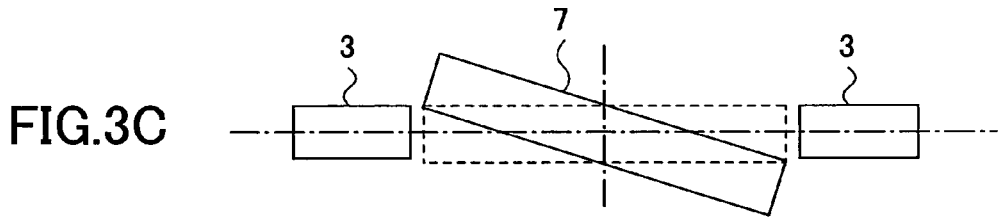
FIG.3C
FIG.4
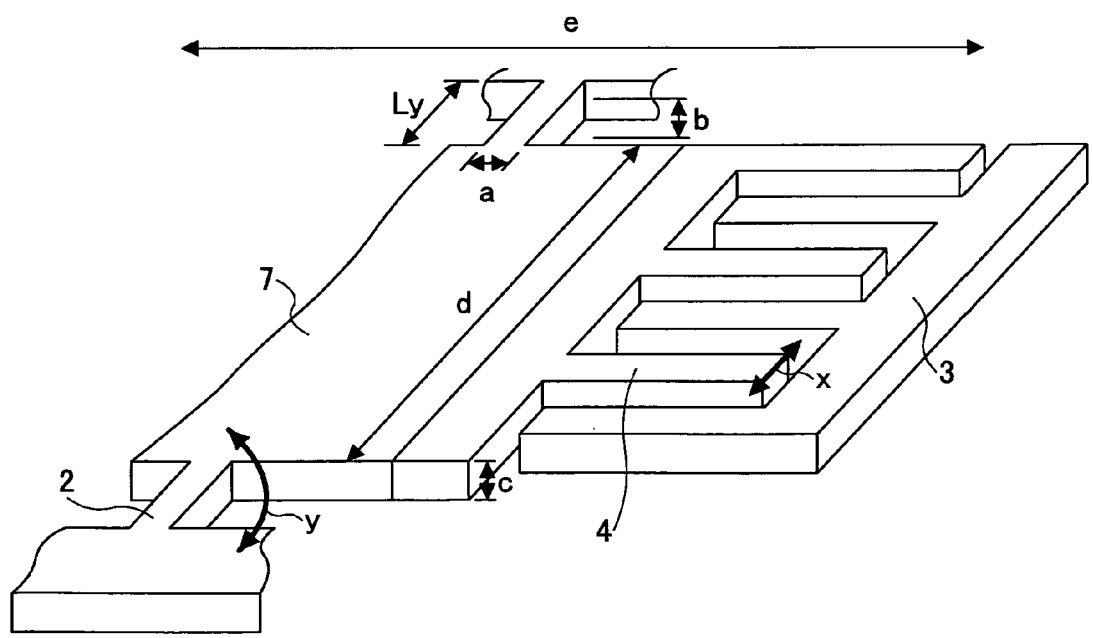

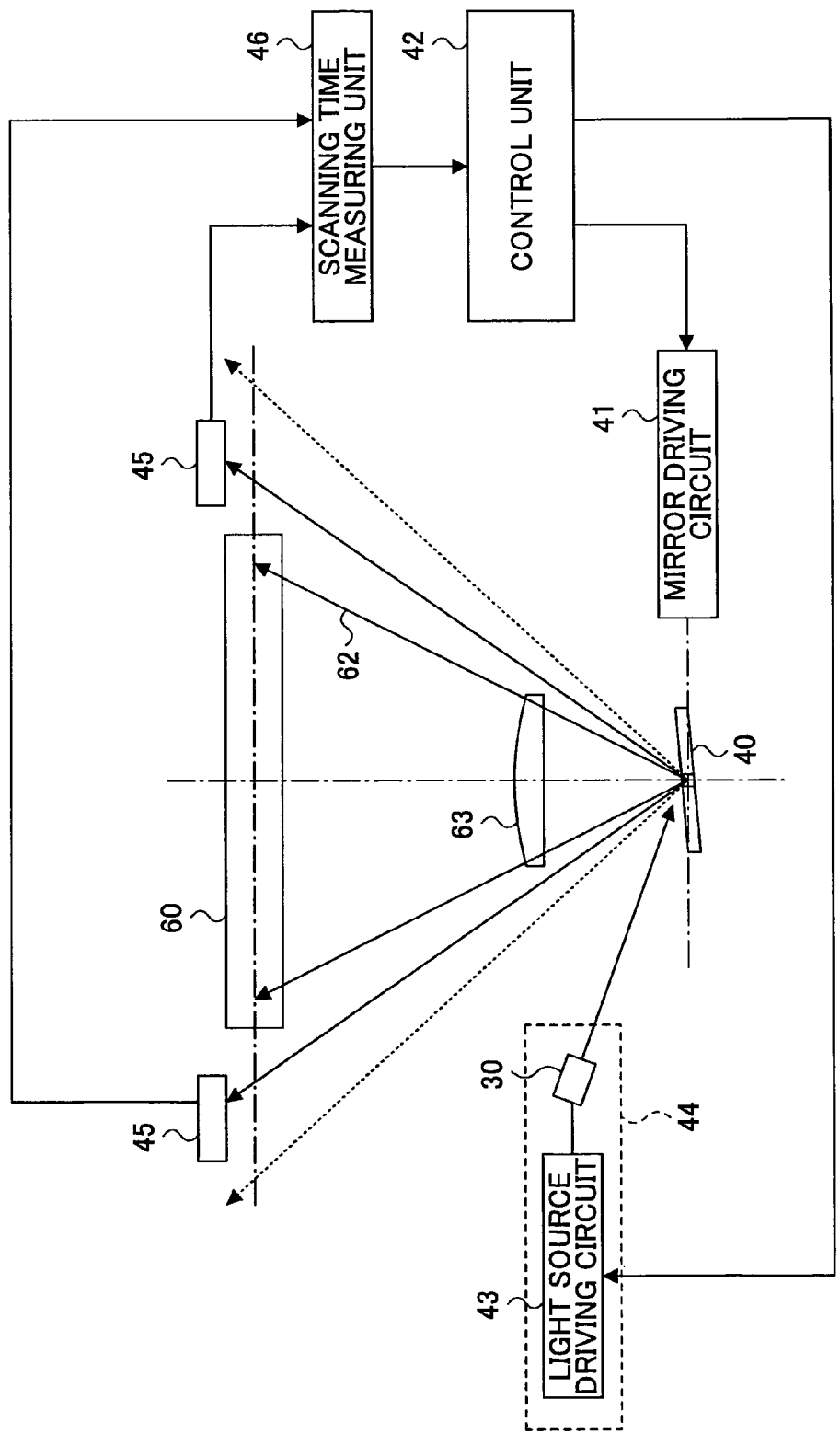

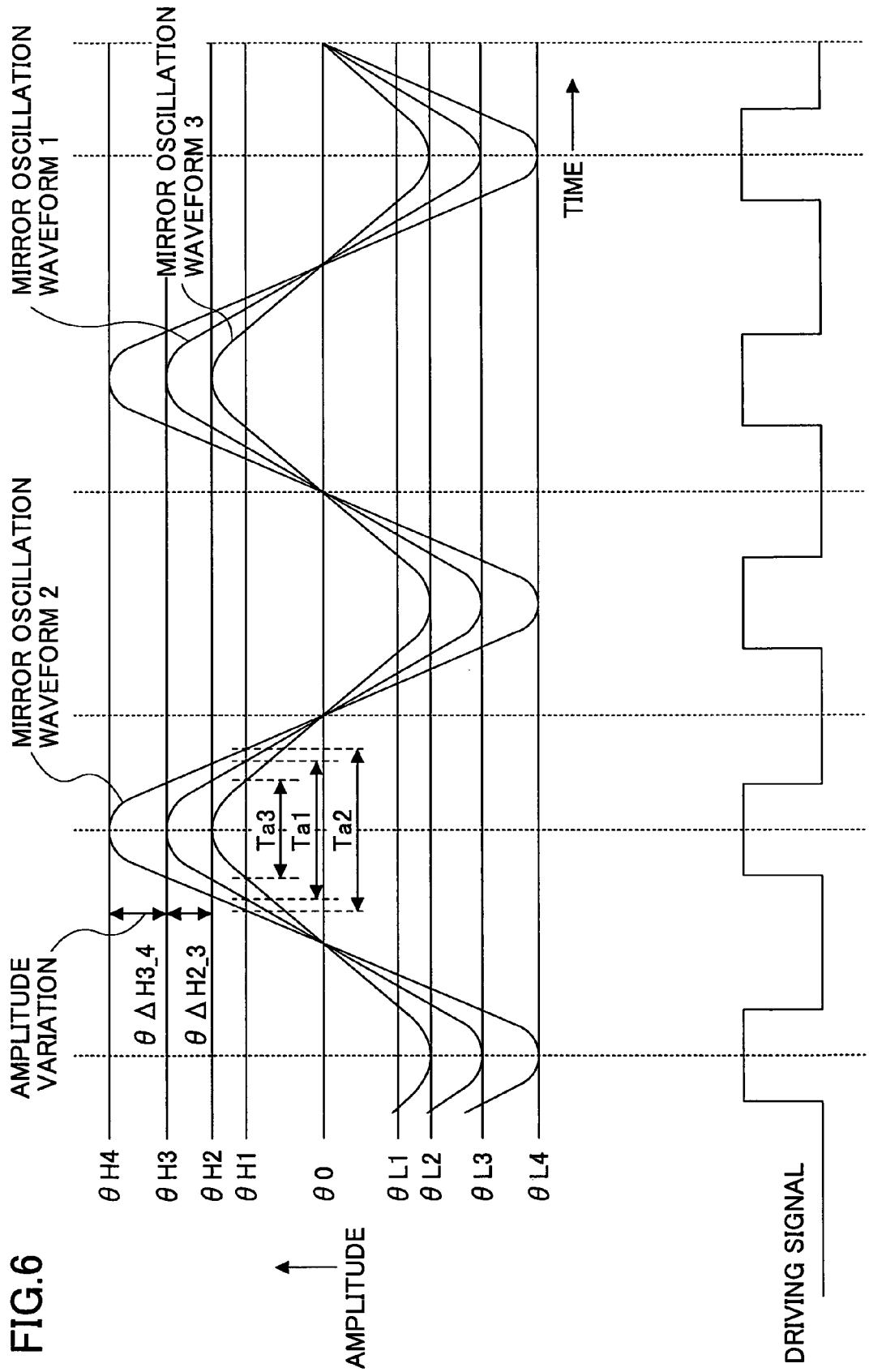

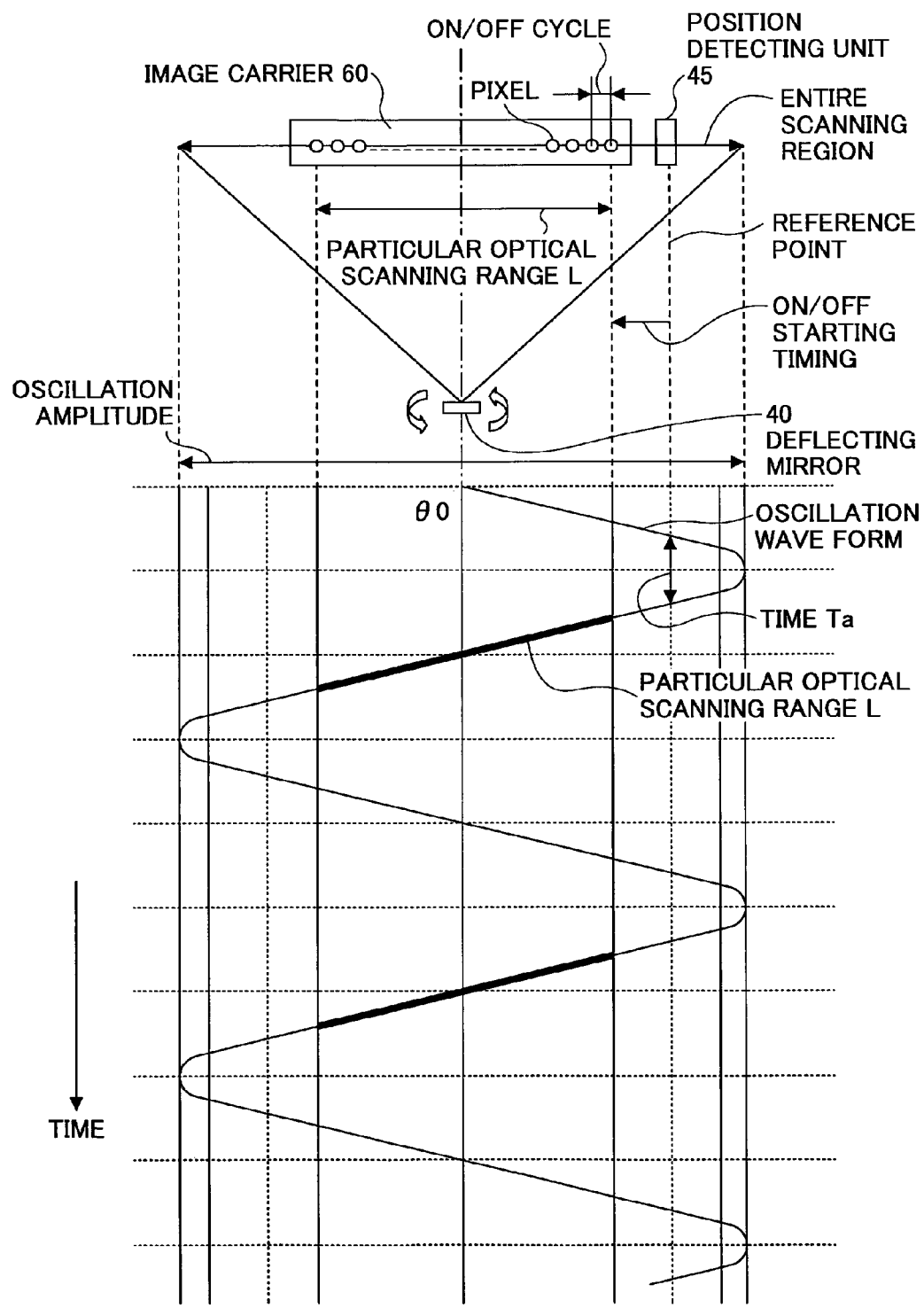

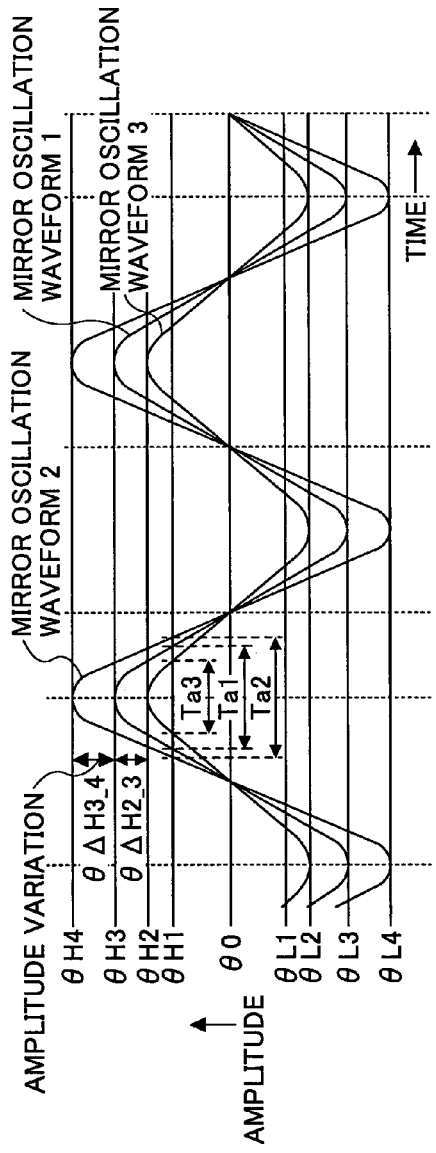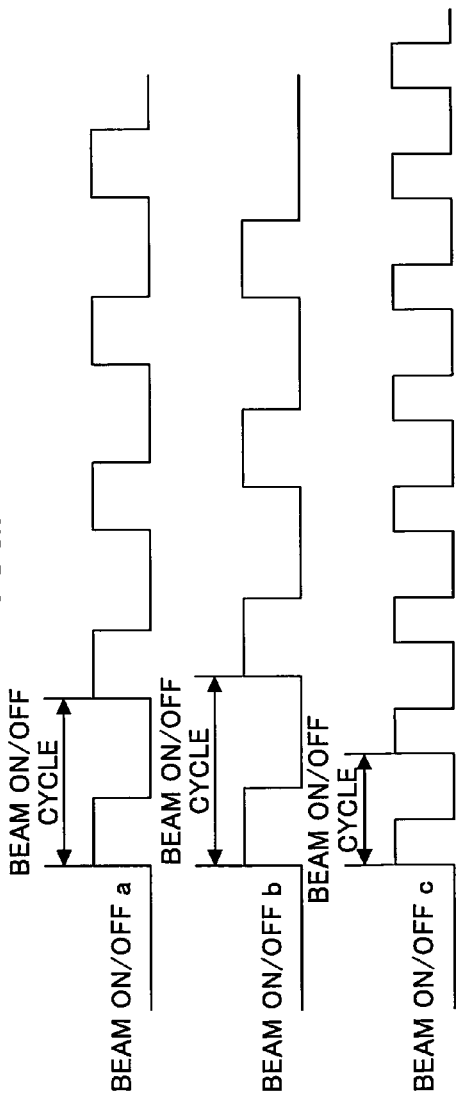
FIG.10A
FIG.10B

OPTICAL SCANNING DEVICE AND IMAGE FORMING APPARATUS

TECHNICAL FIELD

The present invention relates to image forming apparatuses such as laser printers, digital copiers, facsimile machines, and multifunction peripherals including the aforementioned functions, and to optical scanning devices used for optical equipment such as barcode readers and display devices. More specifically, the present invention relates to an optical scanning device including an optical deflector in which a micromirror is oscillated around a torsion bar for scanning a light beam reflected by a deflecting mirror, the optical scanning device being characterized in having a function of detecting the amplitude of the deflecting mirror, and the present invention also relates to an image forming apparatus including such an optical scanning device.

BACKGROUND ART

In conventional optical scanning devices, polygon mirrors are widely used as optical deflectors for scanning light beams. A polygon mirror is rotated at high speed to scan a light beam. To form an image of increased resolution and at increased speed with the use of a polygon mirror, the polygon mirror needs to be rotated at increased speed. However, in order to rotate the polygon mirror at high speed, it is necessary to increase the durability of the bearing and mitigate problems of heat and noise. Thus, there is a limit to high-speed scanning with the use of a rotating body including a mirror.

Meanwhile, in recent years, there has been proposed an optical scanning device for scanning light beams having a configuration in which a micromirror is oscillated by a silicon micro-machining technique. Such micromirror devices can be classified in terms of the driving method. For example, micromirror devices employing an electromagnetic driving method and an electrostatic driving method have been proposed.

For example, patent document 1 (Japanese Laid-Open Patent Application No. 2002-78368) proposes a method using a magnetic field generating unit. Patent document 2 (Japanese Laid-Open Patent Application No. H8-211320) proposes a method using an electrostatic induction generating unit.

In the conventional proposals, when the driving method using the magnetic field generating unit or the driving method using the electrostatic induction generating unit is employed as the method of driving the micromirror movable unit, the driving voltage is steadily applied as sine wave alternating current signals to drive the micromirror movable unit.

A typical example using the electrostatic induction generating unit is disclosed in patent document 3 (Patent No. 3011144), in which the optical scanning device oscillates a mirror with electrostatic attraction.

The structure and operation of a conventional oscillating-type mirror are described with reference to FIG. 14.

FIG. 14 shows a plan view and a cross-sectional view of an oscillating mirror. As shown in FIG. 14, a mirror 102 is disposed in a recessed part of a supporting substrate 101, and the mirror 102 is supported by the supporting substrate 101 via a torsion bar 103 which is integrated with the mirror 102. According to a torsional function of the torsion bar 103, both sides of the mirror 102 can be oscillated in a perpendicular direction with respect to the plane of the mirror. The torsion bar 103 is made of a conductive member, and both edges of the torsion bar 103 are electrically connected to pads 104 provided in the supporting substrate 101. Furthermore, fixed electrodes 107 are supported via insulators 106 on both sides of the recessed part of the supporting substrate 101. The fixed electrodes 107 are disposed in such a manner as to be at higher positions along the oscillating direction with respect to initial positions of mirror electrodes provided on both sides of the mirror 102. At the initial positions of mirror electrodes, the mirror electrodes and the fixed electrodes are disposed in such a manner as to have a difference in height with respect to each other.

In the optical scanning device using this oscillating-type mirror, a high voltage is applied between pads 108 of the fixed electrodes 107 and the pads 104 to which the torsion bar 103 is connected. Accordingly, an electrostatic force is generated between the fixed electrodes 107 and the mirror 102. Due to this electrostatic attraction, one of the sides of the mirror 102 is attracted toward the fixed electrodes 107. This attracting action causes the torsion bar 103 to twist and deform so that the mirror 102 oscillates in a perpendicular direction with respect to the plane of the mirror. Immediately after this oscillating action, the applied voltage to the fixed electrodes 107 is stopped, so that the mirror oscillates in the opposite direction due to the twist restoring force. By repeatedly applying and not applying the voltage, the mirror 102 can be oscillated, and the oscillated mirror 102 reflects a light beam from a light source (not shown) to deflect and scan the light beam.

Incidentally, two kinds of electrostatic driving methods are presently used. In one of the methods, the driving electrodes have a parallel plate electrode configuration. In the other method, the driving electrodes have a comb teeth-shaped electrode configuration. The comb teeth-shaped electrode method is generally said to be significantly superior to the parallel plate electrode method in terms of the amount of movement and the driving force. The method using comb teeth-shaped electrodes is disclosed in, for example, patent document 4 (Japanese Patent No. 3006178), patent document 5 (Japanese Laid-Open Patent Application No. H5-224751), and patent document 6 (Japanese Laid-Open Patent Application No. 2003-241120).

When an optical deflector for scanning light beams is used to form an image by scanning a light beam, the variation in the scanning speed, i.e., the variation (jitters) of the scanning time for scanning an arbitrary distance, generally needs to be less than or equal to 0.02%. The aforementioned micromirror is known to vary in terms of oscillation amplitude in accordance with the variation of the environment in which it is being used. The variation in the oscillation amplitude of the micromirror causes variations in jitters of the light beam scanning operation, which leads to degraded image quality. Many methods have been proposed in an attempt to solve this problem. In a typical method, the jitters are measured, and based on the variation amount of the jitters, the variation of the oscillation amplitude of the micromirror is estimated. Then, the energy applied to the micromirror is adjusted in such a manner as to correct this variation.

Patent document 7 (Japanese Laid-Open Patent Application No. 2005-208460) discloses a method for overcoming the problem of degraded image quality caused by the variation in the resonance frequency of a deflection mirror. Specifically, this method is for adjusting the driving frequency or the oscillation amplitude of the deflecting mirror. That is, the deflecting mirror is directly controlled to maintain image quality.

Furthermore, in patent document 8 (Japanese Patent No. 3584595) and patent document 9 (Japanese Patent No. 3543473), methods of mitigating the image quality from being degraded, which is caused by variations in the deflection frequency, are realized by providing a frequency measuring unit and a time adjusting unit to adjust the light beam irradiation time. That is, with these proposed methods, even if the oscillation frequency of the deflecting mirror varies, the image quality can be improved without directly adjusting the unit for driving the deflecting mirror.

The above cases describe that degraded image quality is caused by the variation in the oscillating frequency of the deflecting mirror. However, characteristics of the optical scanning device using the deflecting mirror developed by inventors of the present invention were evaluated, and it was found that the variation in the oscillating frequency, i.e., the frequency jitter, was less than or equal to 0.003%, and the amplitude variation was larger than this frequency jitter. The measured value showed that the jitter of the light beam caused by amplitude variations was 0.2%, which leads to pixel displacements corresponding to four displaced pixels at a pixel density of 1,200 dpi (dots per inch).

Thus, it was determined that degraded image quality is most likely caused by the oscillation variations in the optical scanning device using the deflecting mirror being developed by the inventors of the present invention.

Patent document 1: Japanese Laid-Open Patent Application No. 2002-78368
Patent document 2: Japanese Laid-Open Patent Application No. H8-211320
Patent document 3: Patent No. 3011144
Patent document 4: Japanese Patent No. 3006178
Patent document 5: Japanese Laid-Open Patent Application No. H5-224751
Patent document 6: Japanese Laid-Open Patent Application No. 2003-241120
Patent document 7: Japanese Laid-Open Patent Application No. 2005-208460
Patent document 8: Japanese Patent No. 3584595
Patent document 9: Japanese Patent No. 3543473

Conventionally, in an attempt to overcome the above-described problems of the background art, the above-described units for directly adjusting the oscillation amplitude of the deflecting mirror are used for mitigating variations in the deflecting mirror. However, the deflecting mirror being developed by the inventors of the present invention has a large time constant as the response characteristic. Thus, it is difficult to adjust such a high-speed deflecting mirror, and there is a limit to preventing degraded image quality by adjusting the oscillation amplitude.

Accordingly, there is a need for an optical scanning device using a deflecting mirror capable of preventing the image quality from being degraded even when oscillating variations occur, by appropriately adjusting a light beam to turn ON/OFF.

Specifically, there is a need for an optical scanning device capable of mitigating degradation of image quality even when oscillating variations occur in the deflecting mirror, by controlling image formation on an image carrier in accordance with the oscillating variations, and there is also a need for an image forming apparatus including such an optical scanning device capable of forming favorable images.

DISCLOSURE OF THE INVENTION

The present invention may solve one or more problems of the related art.

According to a first aspect of the present invention, there is provided an optical scanning device including a light beam generating unit configured to generate a light beam; a light beam deflecting unit configured to receive the light beam and deflect/emit the light beam with a deflecting mirror; a light beam ON/OFF control unit configured to control the light beam generating unit so that the light beam deflected by the light beam deflecting unit is turned ON/OFF in a particular optical scanning range while the light beam is being reciprocally scanned; and a light beam scanning time measuring unit configured to obtain a measurement value by measuring a time or time intervals at which the light beam passes a reference point while being reciprocally scanned, the reference point being provided at an arbitrary position on an edge part of an entire light beam scanning region that is away from a center part of the entire light beam scanning region, wherein timings at which the light beam is turned ON/OFF are controlled in accordance with the measurement value.

According to a second aspect of the present invention, there is provided an image forming apparatus for performing image formation by forming a latent image on an image carrier by scanning a light beam with an optical scanning device and developing the latent image on the image carrier into a visible image, wherein the optical scanning device includes a light beam generating unit configured to generate a light beam; a light beam deflecting unit configured to receive the light beam and deflect/emit the light beam with a deflecting mirror; a light beam ON/OFF control unit configured to control the light beam generating unit so that the light beam deflected by the light beam deflecting unit is turned ON/OFF in a particular optical scanning range while the light beam is being reciprocally scanned; and a light beam scanning time measuring unit configured to obtain a measurement value by measuring a time or time intervals at which the light beam passes a reference point while being reciprocally scanned, the reference point being provided at an arbitrary position on an edge part of an entire light beam scanning region that is away from a center part of the entire light beam scanning region, wherein timings at which the light beam is turned ON/OFF are controlled in accordance with the measurement value.

BRIEF DESCRIPTION OF THE DRAWINGS

FIGS. 3A through 3C are schematic diagrams illustrating the oscillating state of a movable plate of the optical deflector (deflecting mirror) according to an embodiment of the present invention;

FIG. 4 is an enlarged view of a part of the deflecting mirror of the optical deflector shown in FIGS. 2A and 2B;

FIGS. 5A and 5B are schematic diagrams of the optical scanning device according to an embodiment of the present invention using the deflecting mirror as an optical deflector;

FIG. 6 illustrates examples of oscillation waveforms (oscillating trajectories) of the deflecting mirror and driving signals for forming an image with the optical scanning device according to an embodiment of the present invention;

FIG. 7 schematically illustrates an operation of forming pixels onto an image carrier with a deflecting mirror for forming an image with the optical scanning device according to an embodiment of the present invention and an example of an oscillation waveform;

FIGS. 10A and 10B illustrate oscillation waveforms (oscillating trajectories) of the deflecting mirror of the optical scanning device according to an embodiment of the present invention and examples in which the ON/OFF cycles of light beams can be changed;

BEST MODE FOR CARRYING OUT THE INVENTION

A description is given, with reference to the accompanying drawings, of an embodiment of the present invention.

Figure 15:
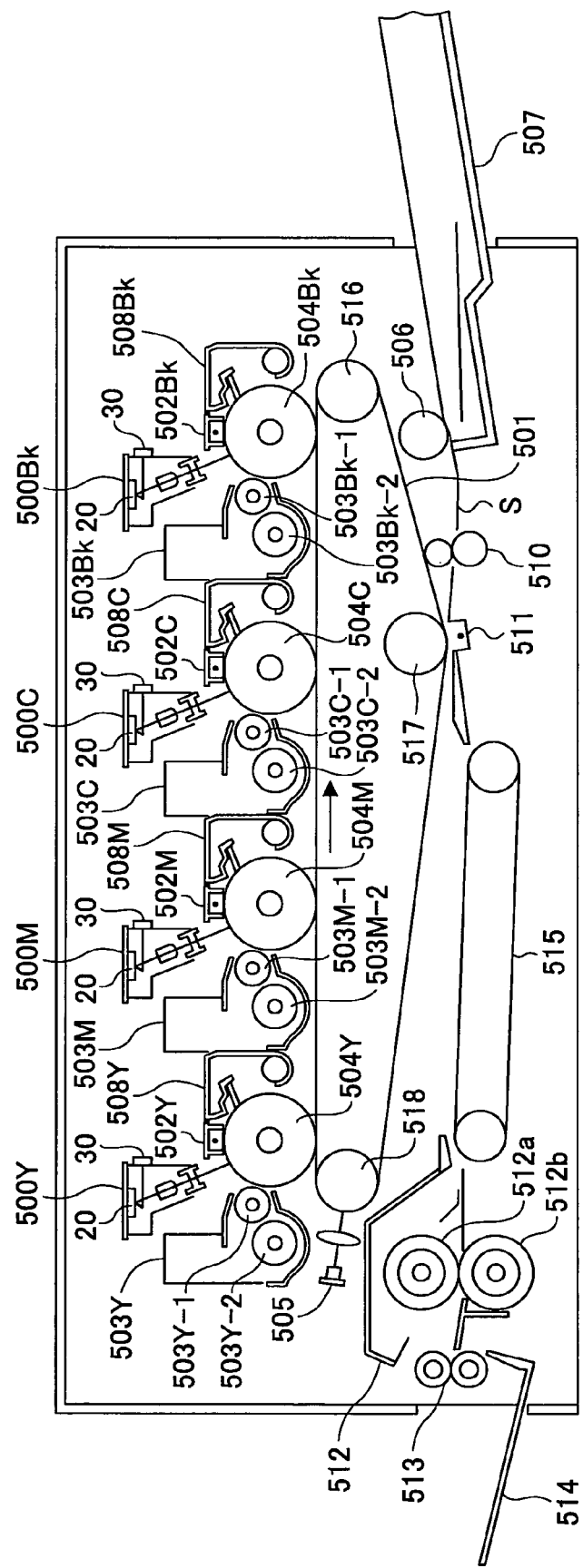
FIG. 15 is a schematic diagram of an image forming apparatus according to an embodiment of the present invention.

First, a description is given of an example of an image forming apparatus including an optical scanning device according to an embodiment of the present invention, with reference to FIG. 15.

FIG. 15 is a schematic diagram of an image forming apparatus according to an embodiment of the present invention, which is an example of a tandem-type color laser printer.

This color laser printer includes photoconductive drums 504Y, 504M, 504C, and 504Bk serving as four image carriers juxtaposed to one another, and an intermediate transfer belt 501. The photoconductive drums 504Y, 504M, 504C, and 504Bk are arranged equidistantly to one another along the movement direction of the intermediate transfer belt 501.

The letter Y accompanying the reference numeral 504 of the photoconductive drum denotes yellow, and similarly, M denotes magenta, C denotes cyan, and Bk denotes black.

The intermediate transfer belt 501 is wound around and supported by three supporting rollers 516, 517, and 518. Among these supporting rollers 516, 517, and 518, one operates as a driving roller and the other two operate as subordinate rollers. The photoconductive drums 504Y, 504M, 504C, and 504Bk are equidistantly arranged along the movement direction of the intermediate transfer belt 501 indicated by an arrow.

A description is given of a configuration around each of the photoconductive drums 504Y, 504M, 504C, and 504Bk, by taking as a representative example the photoconductive drum 504Y corresponding to yellow images. Around the photoconductive drum 504Y, elements are provided in the following order in the rotational direction of the photoconductive drum 504Y (counterclockwise direction), including: a charging device 502Y for uniformly charging the surface of the photoconductive drum 504Y; an optical scanning device 500Y for forming, on the surface of the charged photoconductive drum 504Y, an electrostatic latent image based on image information; a developing device 503Y functioning as a developing means for turning the electrostatic latent image into a visible toner image; the intermediate transfer belt 501 onto which the toner image is transferred; and a cleaning device 508Y for scraping off, with a blade, the toner remaining on the photoconductive drum 504Y after the toner image has been transferred to the intermediate transfer belt 501, and accommodating the scraped off toner. The optical scanning device 500Y is arranged in such a manner that light beams are radiated downward.

The developing device 503Y includes a developing roller 503Y-1 for supplying toner onto the photoconductive drum 504Y and a developer stirring member 503Y-2.

Each of the other photoconductive drums 504M, 504C, and 504Bk has the same configuration as that of the photoconductive drum 504Y, and therefore corresponding elements are denoted by the same reference numerals accompanied by letters representing the respective colors, but are not further described.

When a sensor 505 detects a resist mark formed on the edge of the intermediate transfer belt 501, the sensor 505 outputs a signal. This signal triggers the optical scanning devices 500Y, 500M, 500C, and 500Bk to form electrostatic latent images corresponding to the respective color images at different write start timings in the sub scanning direction. The color images are turned into visible toner images by the developing devices 503Y, 503M, 503C, and 503Bk. These toner images are sequentially transferred onto the intermediate transfer belt 501 so as to be superposed on one another.

Sheets S acting as recording media are separated one by one by a sheet feeding roller 506 and fed out from a sheet feeding tray 507. The fed out sheet S is sent out by a pair of resist rollers 510 at the same timing as when the image of the fourth color (Bk) is formed. Accordingly, the image formed by superposing the four color images is transferred from the intermediate transfer belt 501 to the sheet S by a transfer unit 511.

The sheet S onto which the toner image is transferred is sent to a fixing unit 512 by a conveying belt 515. As this sheet S is sandwiched and conveyed by a fixing roller 512a and a pressurizing roller 512b, the toner image is fixed onto the sheet S with heat and pressure. Then, the sheet S is ejected to a sheet eject tray 514 by sheet eject rollers 513.

Each of the optical scanning devices 500Y, 500M, 500C, and 500Bk includes a light source 30 acting as a light beam generating unit for generating a light beam, an optical deflector 20 acting as a light beam deflecting unit for receiving a light beam radiated from the light source 30 and deflecting/emitting the light beam with a deflecting mirror, and a scanning focusing optical system (scanning lens such as fθ lens and aberration correcting lens) for focusing, on the photoconductor, the light beam to be deflected and scanned by the optical deflector 20. The following is a description of the optical scanning device according to an embodiment of the present invention.

Figure 1:
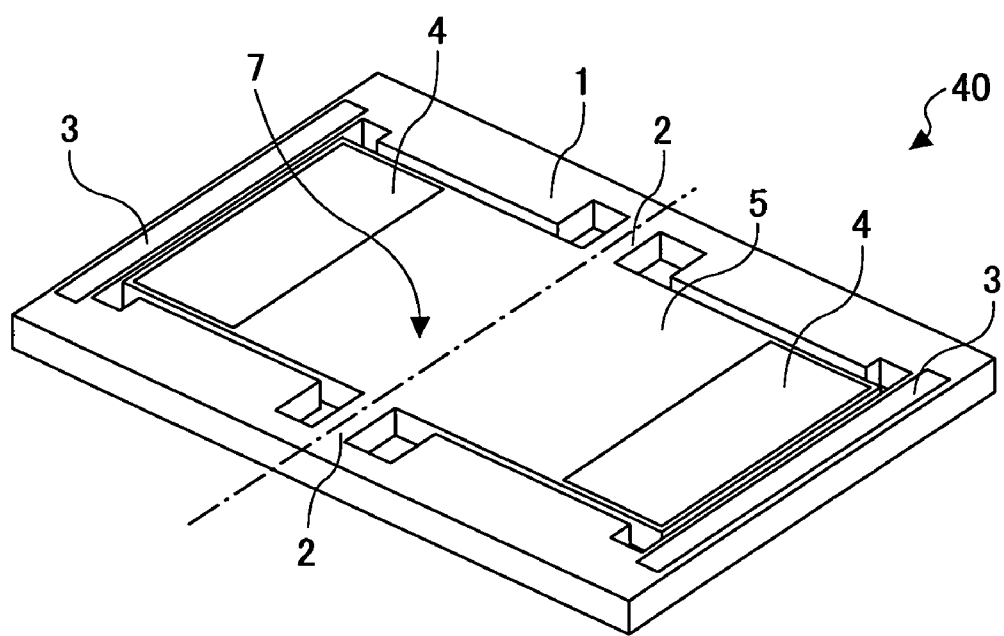
FIG. 1 illustrates an example of an optical deflector (deflecting mirror) used in an optical scanning device according to an embodiment of the present invention.

FIG. 1 illustrates an example of an optical deflector used in the optical scanning device according to an embodiment of the present invention.

As shown in FIG. 1, this optical deflector is configured with a deflecting mirror 40. The deflecting mirror 40 includes a supporting substrate 1 made of silicon, and a movable plate 7 having its center part supported on either edge by the supporting substrate 1 via elastic supporting members 2 acting as torsion shafts, in such a manner as to be freely oscillated. The surface of the movable plate 7 is a reflection surface (mirror surface) 5, and movable electrodes 4 are provided on both edges. Fixed electrodes 3 are provided on the supporting substrate 1 at positions corresponding to the movable electrodes 4. There is a gap of, for example, 5 μm, between each movable electrode 4 and the fixed electrode 3 facing the movable electrode 4. By applying a voltage between these electrodes, electrostatic attraction is generated between the electrodes so that the edge face of the movable plate 7 is pulled toward the fixed electrode 3.

With reference to FIGS. 3A through 3C, a description is given of an operation of an optical deflector using the deflecting mirror 40 having the configuration shown in FIG. 1.

In FIGS. 3A through 3C, the movable electrodes 4 provided on the movable plate 7 are connected to ground via lead wires (not shown) and pads drawn out to the supporting substrate 1 made of silicon.

A description is given of the positional relationship between the fixed electrodes 3 and the movable electrodes 4 in FIGS. 3A through 3C. In the state illustrated in FIG. 3A, when a voltage of, for example, 30 V is applied to the fixed electrodes 3, the movable plate 7 oscillates in a clockwise direction as viewed in FIG. 3A due to an electrostatic force functioning between the fixed electrodes 3 and the movable electrodes 4 and the torsion rigidity of the beams configured with the elastic supporting members 2. As shown in FIG. 3B, when the movable plate 7 reaches a horizontal position, the applied voltage to the fixed electrodes 3 is turned off. Accordingly, due to the moment of inertia, the movable plate 7 further oscillates in the clockwise direction. Finally, as shown in FIG. 3C, the movable plate 7 oscillates to a position where the moment of inertia and the torsion rigidity of the beams become equal. When the movable plate 7 reaches a position of a maximum oscillation angle, the movable plate 7 temporarily stops, and then starts oscillating in a direction opposite to the direction in which it has been oscillating. That is, the movable plate 7 starts oscillating in the counterclockwise direction from the state shown in FIG. 3C. When voltage is once again applied to the fixed electrodes 3 at an appropriate point of time after the movable plate 7 has started to oscillate in the counterclockwise direction, the movable plate 7 oscillates in the counterclockwise direction due to an electrostatic force functioning between the fixed electrodes 3 and the movable electrodes 4, and the torsion rigidity of the beams. When the movable plate 7 once again reaches the horizontal position, the applied voltage to the fixed electrodes 3 is turned off. Accordingly, due to the moment of inertia, the movable plate 7 further oscillates in the counterclockwise direction. Finally, as shown in FIG. 3A, the movable plate 7 oscillates to a position where the moment of inertia and the torsion rigidity of the beams become equal.

By applying a voltage to the fixed electrodes 3 at a frequency corresponding to the resonance frequency of the movable plate 7, the movable plate 7 can be oscillated at a large displacement angle.

FIG. 6 illustrates examples of voltage application timings and oscillating trajectories of the movable plate 7 in such a driving unit. In FIG. 6, three mirror oscillating waveforms and a sequence of driving signals are shown. As shown in FIG. 6, for a phase α from the time when the oscillating angle is maximum to the voltage application timing, the voltage is preferably applied for an arbitrary time t while the movable plate 7 oscillates in a direction from a point before the maximum oscillating angle to where the oscillating angle is zero. The amplitude of the mirror varies according to the voltage application time.

Figure 2A:
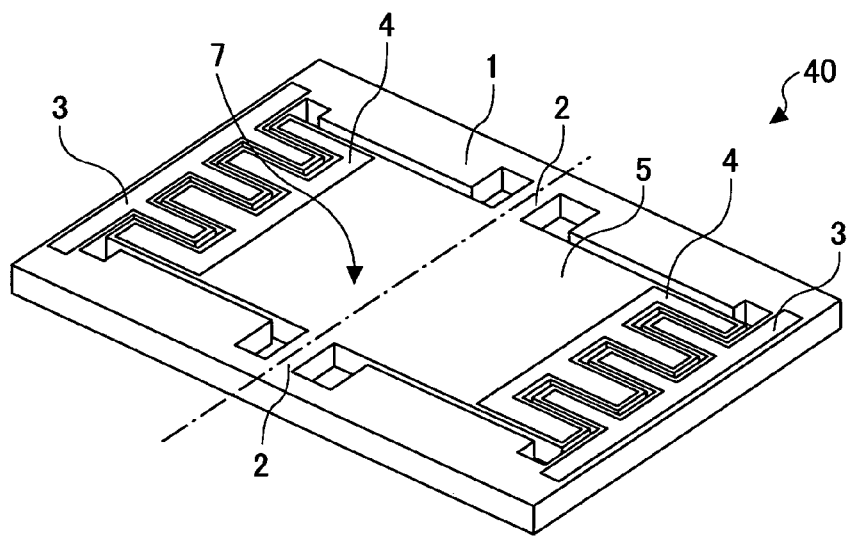
FIGS. 2A and 2B illustrate another example of the optical deflector (deflecting mirror) used in the optical scanning device according to an embodiment of the present invention.
Figure 2B:
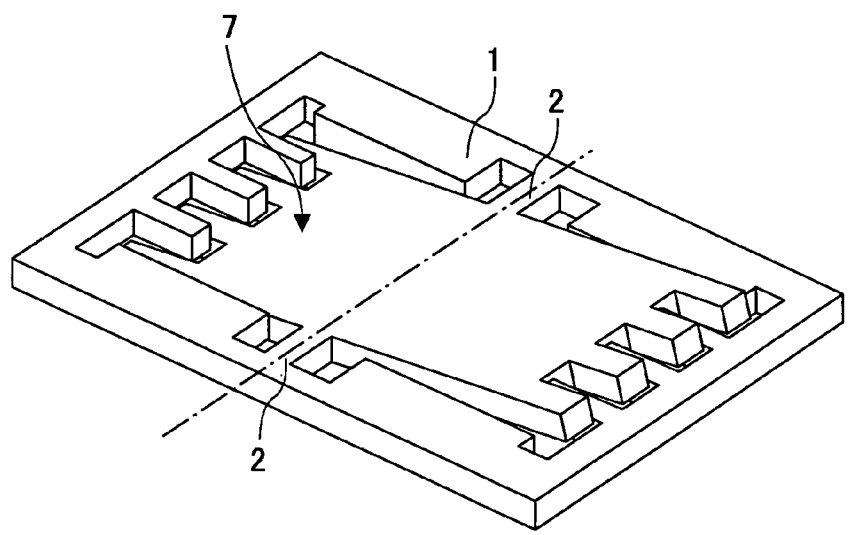

Next, FIGS. 2A and 2B illustrate another example of the optical deflector used in the optical scanning device according to an embodiment of the present invention. As shown in FIG. 2A, this optical deflector is configured with the deflecting mirror 40, similarly to that of FIG. 1. However, in this deflecting mirror, the movable electrodes 4 and the fixed electrodes 3 have comb teeth structures.

That is, in the example shown in FIGS. 2A and 2B, the edges of the movable plate 7 that are not supported by beams of the supporting substrate 1 are comb teeth-shaped as shown in FIG. 2B. Comb teeth-shaped movable electrodes 4 are provided at these parts as shown in FIG. 2A. The fixed electrodes 3 having a driving function are also comb teeth-shaped, and are provided on the inner frame of the supporting substrate 1 at positions corresponding to the movable electrodes 4. The movable electrodes 4 face the fixed electrodes 3 in meshed engagement, with microscopic gaps therebetween. These comb teeth shapes make the electrodes function as driving electrodes. By making the fixed electrodes 3 and the movable electrodes 4 have comb teeth shapes, the surface areas of the electrodes can be increased, and therefore the driving torque can be increased, so that the oscillating angle of the movable plate 7 can be increased.

When a light beam is radiated to the reflection surface (mirror surface) 5 of the oscillating movable plate 7, the incident light can be deflected by the reflection surface 5 of the movable plate 7 as the movable plate 7 oscillates.

FIG. 4 illustrates a part of the deflecting mirror 40 shown in FIGS. 2A and 2B. As shown in FIG. 4, the elastic supporting members 2 have torsion beam structures. The movable plate 7 supported by the elastic supporting members 2 can rotatably oscillate by using the elastic supporting members 2 as the axis. An oscillating frequency fy of the movable plate 7 is approximated by the following formula.

$$fy = 1/2\pi \sqrt{(Ky/Iy)}$$

fy: resonance frequency of movable plate 7
Iy: moment of inertia
Ky: spring constant The spring constant Ky can be obtained by the following formula, where the beam width is a, the beam height is b, and the beam length is Ly.

$$Ky = (Jp \times G)/Ly$$

$$Jp = 0.141 \times a \times b^3$$

$$G = Ey/(2(1+\iota))$$

Ey: Young's modulus
ι: Poisson's ratio

The moment of inertia Iy can be obtained by the following formula, where the width of the movable plate 7 is d, the length is e, and the thickness is c.

$$Iy = My \times (e^2 + c^2)/12$$

$$My = \rho(d \times e \times c)$$

From the above formulae, the resonance frequency fy is determined by the shapes of the elastic supporting members 2 and the movable plate 7.

Figure 5A:
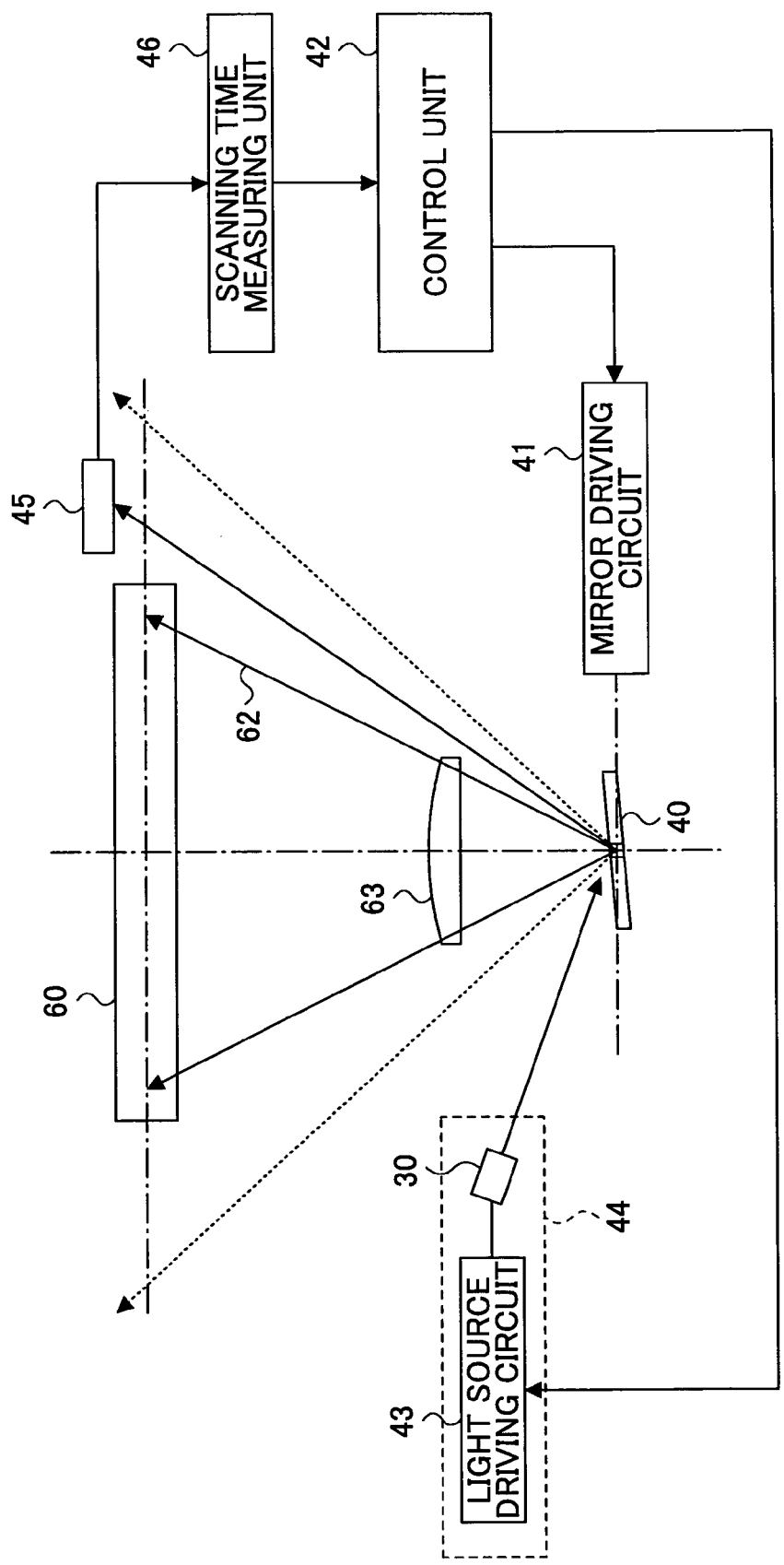

Next, FIGS. 5A and 5B are schematic diagrams of the optical scanning device using the above-described deflecting mirror 40 as an optical deflector.

The optical scanning device shown in FIG. 5A includes the deflecting mirror 40 which is an optical deflector, a light beam generating unit 44, a scan focusing lens 63, and a signal detecting unit (also referred to as position detecting unit) 45. The light beam generating unit 44 includes the light source 30, such as a laser diode (LD), and a light source driving circuit (LD driver) 43 for driving the light source 30. A light beam from the light source 30 of the light beam generating unit 44 is incident on the deflecting mirror 40 via a coupling optical system (not shown) (coupling lens, aperture, cylindrical lens, etc.). Then, a light beam 62 from the light beam generating unit 44 is deflected and scanned by the deflecting mirror 40, so that the light beam 62 is reciprocally scanned (forward and backward) over the surface of an image carrier 60 (corresponding to the photoconductive drum 504 shown in FIG. 15) and the surface of the signal detecting unit 45, which are surfaces to be scanned. The signal detecting unit 45, which is a unit for detecting the position of a light beam, includes an optical detector such as a photodiode and a line sensor. The signal detecting unit 45 is arranged at a predetermined reference position to detect when a light beam passes the reference position and output a signal. Based on an output signal from this signal detecting unit (position detecting unit) 45, a light beam scanning time measuring unit 46 measures the time or time intervals at which the light beam passes the predetermined reference point. A detection signal obtained as a result of this measurement is sent to a control unit 42 including a light beam ON/OFF control unit for controlling the light beam generating unit 44, and the light beam generating unit 44 controls the light source driving circuit 43. Oscillation of the deflecting mirror 40 is performed as the control unit 42 controls a mirror driving circuit 41.

In addition to the configuration shown in FIG. 5A, the optical scanning device shown in FIG. 5B includes another signal detecting unit, so that two signal detecting units 45 are disposed at predetermined reference points (reference point 1, reference point 2), each provided on either edge of the image carrier 60.

In the optical scanning device for scanning light beams with the deflecting mirror 40 having the configuration as shown in FIGS. 5A and 5B, the deflecting mirror 40 reciprocally scans the light beam, unlike conventional rotation-type polygon mirrors. Therefore, there is a turning-back point of the optical scanning direction.

While the light beam scans the image carrier 60, the light beam is turned on and off (ON/OFF) at predetermined intervals so that an image is formed on the image carrier 60. However, it is known that the image quality is affected by the precision in the positions of pixels formed by scanning the light beam over the image carrier 60. Generally, it is said that variations in adjacent pixels are to be within ½ pixel.

Patent document 7 describes a method performed by such an optical scanning device using the deflecting mirror as the optical deflector. Specifically, the driving frequency or the oscillation amplitude of the deflecting mirror is adjusted to overcome the problem of degraded image quality caused by the variation in the resonance frequency of the deflection mirror. That is, the deflecting mirror is directly controlled to maintain image quality.

In the optical scanning device developed by the inventors of the present invention, it was found that the variations in pixel positions on the image carrier 60 are mainly caused by variations in the oscillation amplitude of the deflecting mirror 40. Therefore, it is necessary to reduce the variations in the oscillation amplitude of the deflecting mirror 40.

The typical method that is conventionally proposed to solve such a problem is to measure the scanning time of scanning a valid scanning region and adjusting the amplitude based on the measurement results, as described in patent document 7.

However, according to experiments conducted by the inventors of the present invention, even by performing the method of adjusting the amplitude, it was found that jitters are improved only by around 0.04%, and therefore positions of the pixels are displaced by about two pixels. Accordingly, the image quality is not improved. In particular, in an image forming apparatus as shown in FIG. 15, the positional displacement of pixels at the image forming units of the respective colors result in color displacement of the images superposed on the intermediate transfer belt, which degrades the image quality.

Thus, methods proposed by inventors of the present invention for improving image quality are described in the embodiments described below.

FIG. 6 illustrates oscillating trajectories of the deflecting mirror 40, with the horizontal axis representing the time and the vertical axis representing the amplitude. As illustrated in FIG. 6, an oscillation waveform 1, an oscillation waveform 2, and an oscillation waveform 3 have the same oscillating frequency but different oscillation amplitudes. In such a case, the extent of variation can be found by measuring the times at arbitrary points including the point where the light beam scanning direction turns around.

As shown in FIG. 6, the oscillation waveform 1 has an oscillation amplitude extending between $\theta L3$ and $\theta H3$. During the oscillation, a scanning time Ta1 is measured, which is the time from a reference point at $\theta H1$ to $\theta H3$ and back from $\theta H3$ to $\theta H1$. When an oscillation increasing variation $\theta \Delta H3\_4$ occurs with respect to the oscillation waveform 1, a scanning time Ta2 at $\theta H1$ is measured. That is, the oscillation variation can be found by measuring the scanning time at the position of $\theta H1$ being used as the reference. In this manner, the scanning times are measured, and the value of oscillation variation is obtained based on the measured times, and the oscillation amplitude of the deflecting mirror 40 is adjusted accordingly. Thus, adjustments can be made so that the desired oscillation amplitude is constant, thereby preventing the image quality from degrading. However, in an embodiment of the present invention, a new method of preventing the image quality from degrading is added. Specific embodiments of the present invention are described below.

First Embodiment

First, a description is given of a first embodiment of the present invention.

FIG. 7 schematically illustrates an operation of turning ON/OFF a light beam and scanning the light beam over the image carrier 60 with the use of the deflecting mirror 40, an oscillation waveform of the deflecting mirror, and various units according to an embodiment of the present invention.

In the present embodiment, a light beam from the light beam generating unit 44 which generates light beams is incident on the deflecting mirror 40, and the deflecting mirror 40 deflects/emits the light beam. While the light beam is being reciprocally scanned, a light beam ON/OFF control unit (the control unit 42 shown in FIG. 5) controls the light beam generating unit 44 to turn ON/OFF the light beam in a particular light scanning range L (corresponding to substantially straight portions of the oscillating wavelength in FIG. 7 (where the speed is substantially constant)).

Furthermore, in the first embodiment, a reference point is provided at an arbitrary position on an edge part of the entire light beam scanning region that is away from a center part of the entire light beam scanning region. A light beam scanning time measuring unit (the signal detecting unit (position detecting unit) 45 and the light beam scanning time measuring unit 46 shown in FIG. 5A) measures a time Ta from when the light beam passes the reference point while being scanned in a forward direction, turns back in a backward direction at the end of the forward direction, until the light beam passes the reference point while being scanned in the backward direction.

In accordance with the measured light beam scanning time Ta, the light beam can be turned ON/OFF within an arbitrary time from the reference point at the arbitrary position on the edge part. The light beam can be cyclically and repeatedly turned ON/OFF within the arbitrary time.

When an image is formed on the image carrier 60 with the deflecting mirror 40 by turning ON/OFF the light beam, the timing of starting to turn ON/OFF the light beam is adjusted according to the scanning time from the reference point. The number of times of turning ON/OFF the light beam in a particular optical scanning range L is calculated based on the density of pixels formed in the particular optical scanning range L. For example, assuming that the pixel density is M dpi (dots per inch), the total number of pixels is L×M. The distance between adjacent pixels is 1/M inch. In order to prevent the image quality from degrading, the variation in the distance between pixels needs to be less than or equal to ½ pixel. In order to mitigate the variation in the distance between pixels, it is necessary to mitigate the variation in the timings of turning ON/OFF the light beam.

As described above, the variation in the position of starting to turn ON/OFF the light beam or the variation in the timing of turning ON/OFF the light beam is likely to be caused by the variation in the oscillation amplitude of the deflecting mirror 40. However, by measuring and managing the variation value of the oscillation amplitude, it is possible to adjust, in accordance with the variation, the timings at which the light beam is turned ON/OFF and the timing of starting to turn ON/OFF the light beam, thereby mitigating degraded image quality.

Second Embodiment

Next, a description is given of a second embodiment of the present invention.

Figure 8:
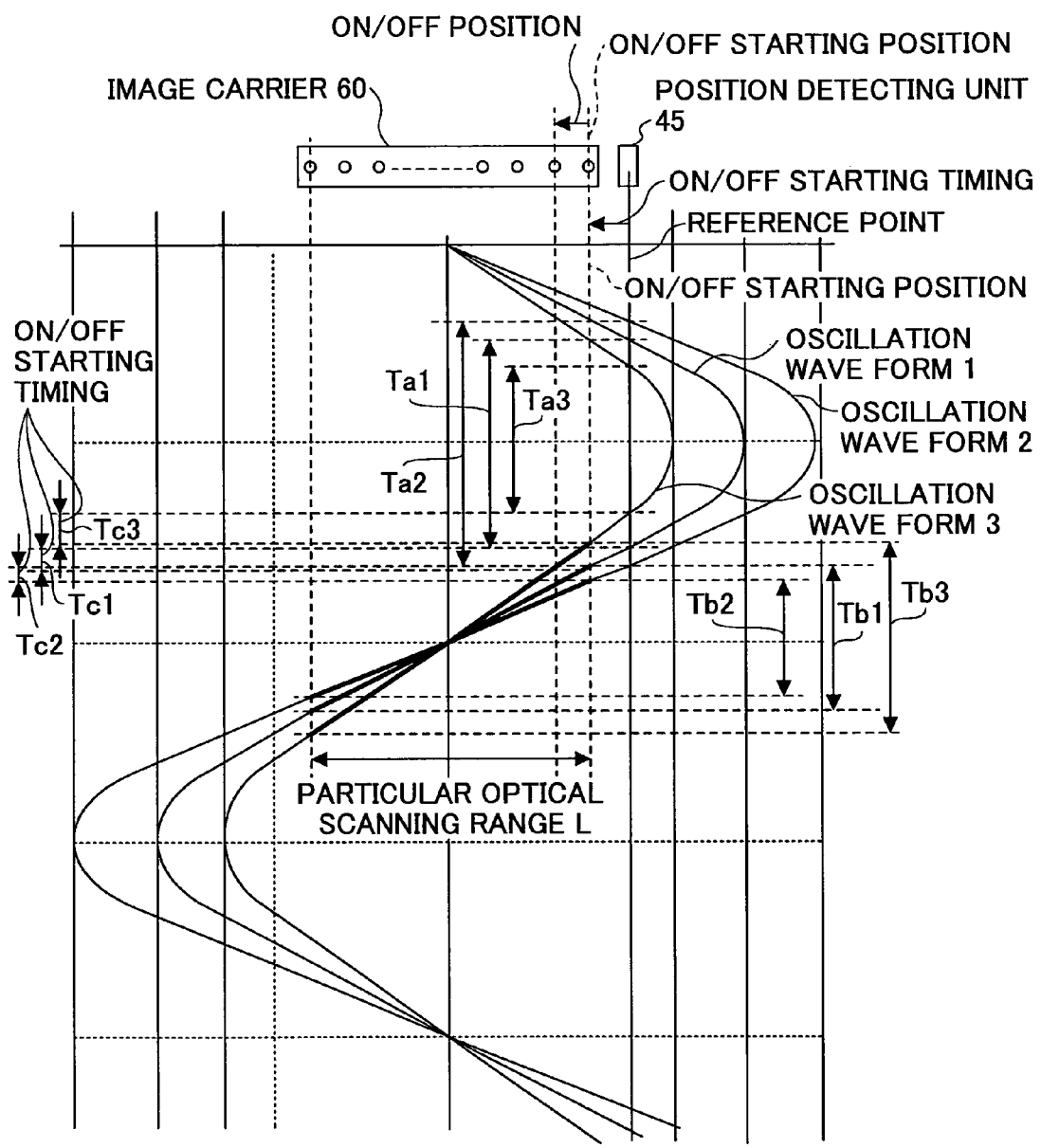
FIG. 8 illustrates an example of timings of starting to turn ON/OFF the light beam and times according to variations in the oscillation amplitude of the deflecting mirror when forming images with the optical scanning device according to an embodiment of the present invention.

FIG. 8 illustrates a mechanism of the variation in the timing of starting to turn ON/OFF the light beam caused by the variation in the oscillating amplitude of the deflecting mirror. In the following, a description is given of a method of adjusting the timing of starting to turn ON/OFF the light beam according to an embodiment of the present invention.

With regard to the oscillation waveform 1 shown in FIG. 8, when the time taken for the light beam to be reciprocally scanned is a measurement time Ta1 which is measured by the position detecting unit 45 at the reference point, the light beam starts to be turned ON/OFF at a timing Tc1 at the light beam ON/OFF starting position. Tc1 is obtained from Ta1, and Tc1 is uniquely defined with t=Ta1.

Next, a description is given of a case where the oscillation waveform 1 changes to the state of the oscillation waveform 2.

With regard to the oscillation waveform 2 shown in FIG. 8, when the time taken for the light beam to be reciprocally scanned is a measurement time Ta2, which is measured by the position detecting unit 45 at the reference point, the light beam starts to be turned ON/OFF at a timing Tc2 at the light beam ON/OFF starting position. Tc2 is obtained from Ta2, and Tc2 is uniquely defined with t=Ta2.

Also in a case where the oscillation waveform 1 changes to the state of the oscillation waveform 3, Tc3 is uniquely defined in the same manner.

As described above, even if the oscillation amplitude of the deflecting mirror varies, the scanning time of reciprocal scanning is measured at the reference point, and based on this scanning time, the timing of starting to turn ON/OFF the light beam is determined. Accordingly, positional displacement of the first pixel is prevented, thereby mitigating the image quality from being degraded.

Third Embodiment

Next, a description is given of a third embodiment of the present invention. A description is given of another method of adjusting the timing of turning ON/OFF the light beam according to an embodiment of the present invention.

With regard to the oscillation waveform 1 shown in FIG. 8, when the time taken for the light beam to be reciprocally scanned is a measurement time Ta1 which is measured by the position detecting unit 45 at the reference point, Tb1 is an overall time of the light beam ON/OFF cycles of the total number of pixels M×L corresponding to a pixel density M (dpi) in a particular optical scanning range L. In this case, the cycle TG1 between adjacent pixels is obtained by the following formula.

$$TG1=Tb1/(M\times L)[\sec]$$

When the light beam is turned ON/OFF in accordance with pixels generated in these cycles, the obtained image will have uniform distances between the pixels. Tb1 and TG1 are obtained from Ta1, and Tb1 and TG1 are uniquely defined with t=Ta1.

Next, a description is given of a case where the oscillation waveform 1 changes to the state of the oscillation waveform 2.

With regard to the oscillation waveform 2 shown in FIG. 8, when the time taken for the light beam to be reciprocally scanned is a measurement time Ta2 which is measured by the position detecting unit 45 at the reference point, Tb2 is an overall time of the light beam ON/OFF cycles of the total number of pixels M×L corresponding to a pixel density M (dpi) in the particular optical scanning range L. In this case, the cycle TG2 between adjacent pixels is obtained by the following formula.

$$TG2=Tb2/(M\times L)[\sec]$$

When the light beam is turned ON/OFF in accordance with pixels generated in these cycles, the obtained image will have uniform distances between the pixels. Tb2 and TG2 are obtained from Ta2, and Tb2 and TG2 are uniquely defined with t=Ta2.

Also in a case where the oscillation waveform 1 changes to the state of the oscillation waveform 3, Tb3 and TG3 are uniquely defined in the same manner.

As described above, even if the oscillation amplitude of the deflecting mirror varies, the scanning time is measured, and based on this scanning time, the timing of starting to turn ON/OFF the light beam is determined. Accordingly, positional displacement between adjacent pixels is prevented, thereby mitigating the image quality from being degraded.

Fourth Embodiment

Next, a description is given of a fourth embodiment of the present invention.

In the third embodiment, a description is given of a method of adjusting the timing of the cycle of turning ON/OFF the light beam in such a manner that the distances between adjacent pixels are uniform in the particular optical scanning range L, even when the oscillation of the deflecting mirror varies. In the following, a description is given of a method of further mitigating the image quality from degrading.

As illustrated in FIG. 10A, the cycles of turning ON/OFF the light beam TG1, TG2, and TG3 can be adjusted in accordance with the measurement times (scanning times) Ta1, Ta2, and Ta3 corresponding to times taken for the light beam to be reciprocally scanned with the oscillation waveforms 1 through 3, respectively, measured by the position detecting unit 45 at the reference point. When the ON time of the light beam in one cycle is fixed, the light beam irradiation energy will change when forming pixels on the image carrier. FIG. 10B illustrates a case where the light beam ON times are different according to the scanning time; however, this will cause inconsistencies in the density among pixels, which leads to degraded image quality.

Figure 9A:
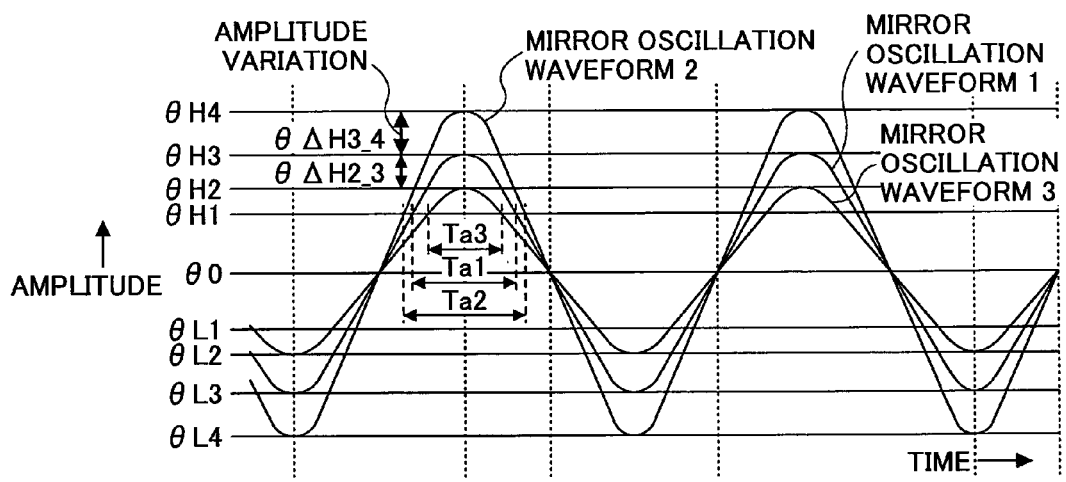
FIGS. 9A and 9B illustrate oscillation waveforms (oscillating trajectories) of the deflecting mirror of the optical scanning device according to an embodiment of the present invention and examples of ON times and ON levels of light beams.
Figure 9B:
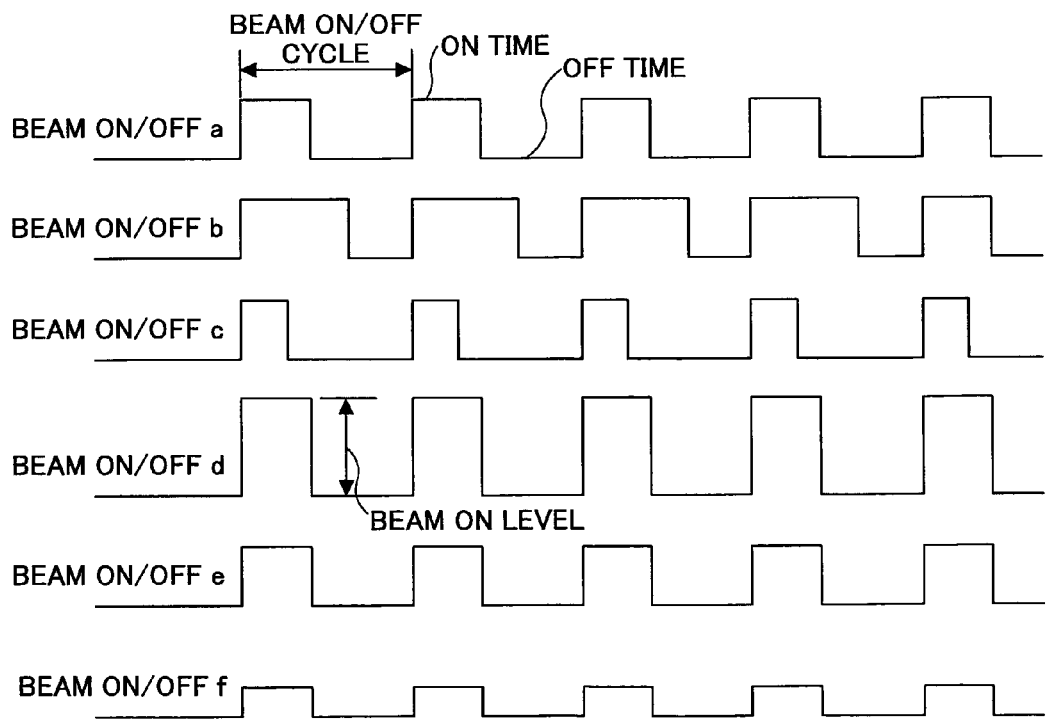

Therefore, in the present embodiment, as shown in FIGS. 9A and 9B, when forming an image on an image carrier, the light beam irradiation energy for radiating a light beam onto an image carrier to form an image is adjusted in accordance with the scanning time Ta, in order to achieve a uniform pixel density. As a means for adjusting the light beam irradiation energy, there is a method of adjusting the ON time in the light beam ON/OFF as shown in "light beam ON/OFF a through c" illustrated in FIG. 9B. As another means, there is a method of adjusting the ON level in the light beam ON/OFF as shown in "light beam ON/OFF d through f" illustrated in FIG. 9B. Yet another effective method is to combine both of these means.

Fifth Embodiment

Next, a description is given of a fifth embodiment of the present invention.

Figure 11:
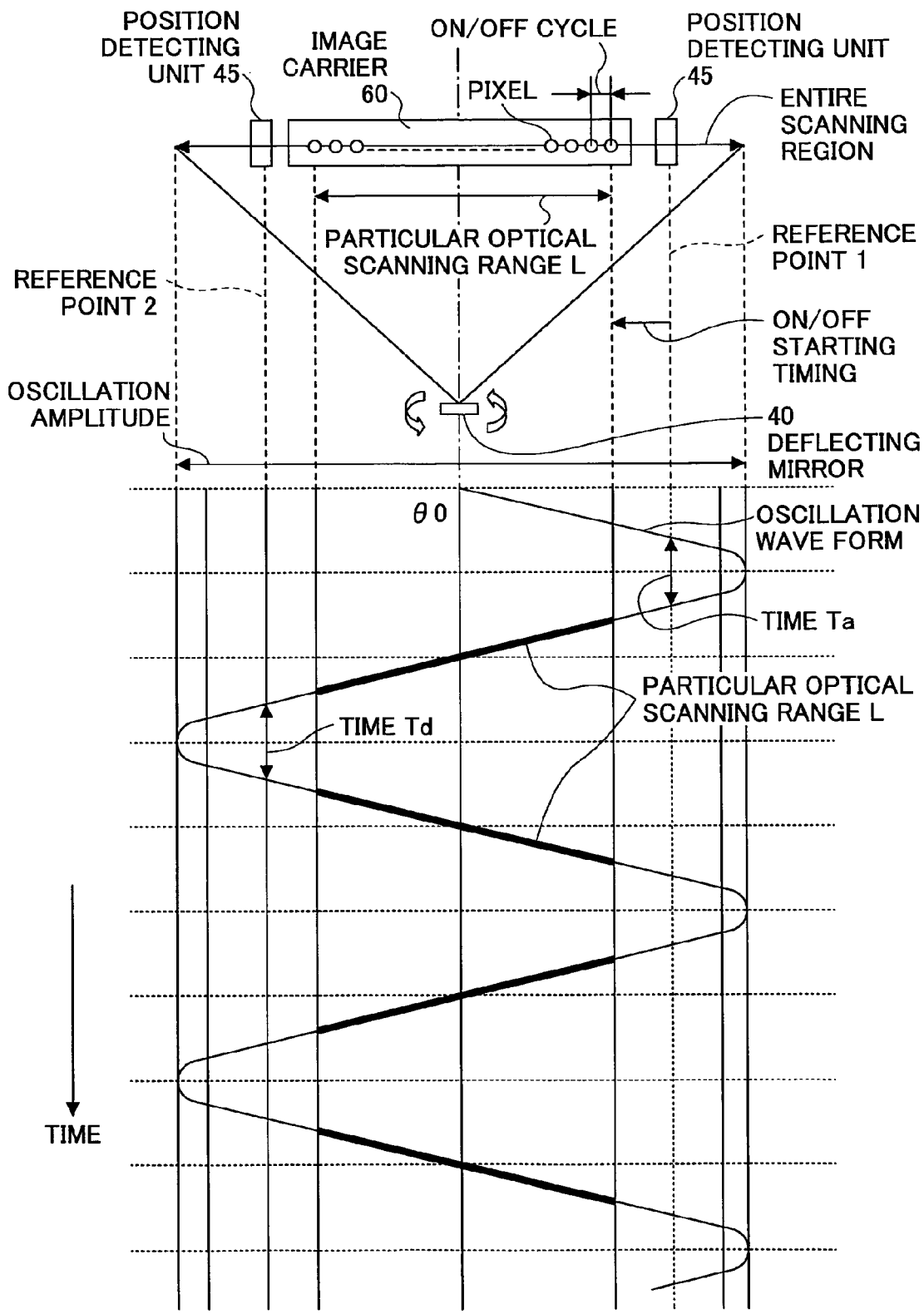
FIG. 11 schematically illustrates an operation of forming pixels onto an image carrier with a deflecting mirror for forming an image from both directions with the optical scanning device according to an embodiment of the present invention and an example of an oscillation waveform.
Figure 13:
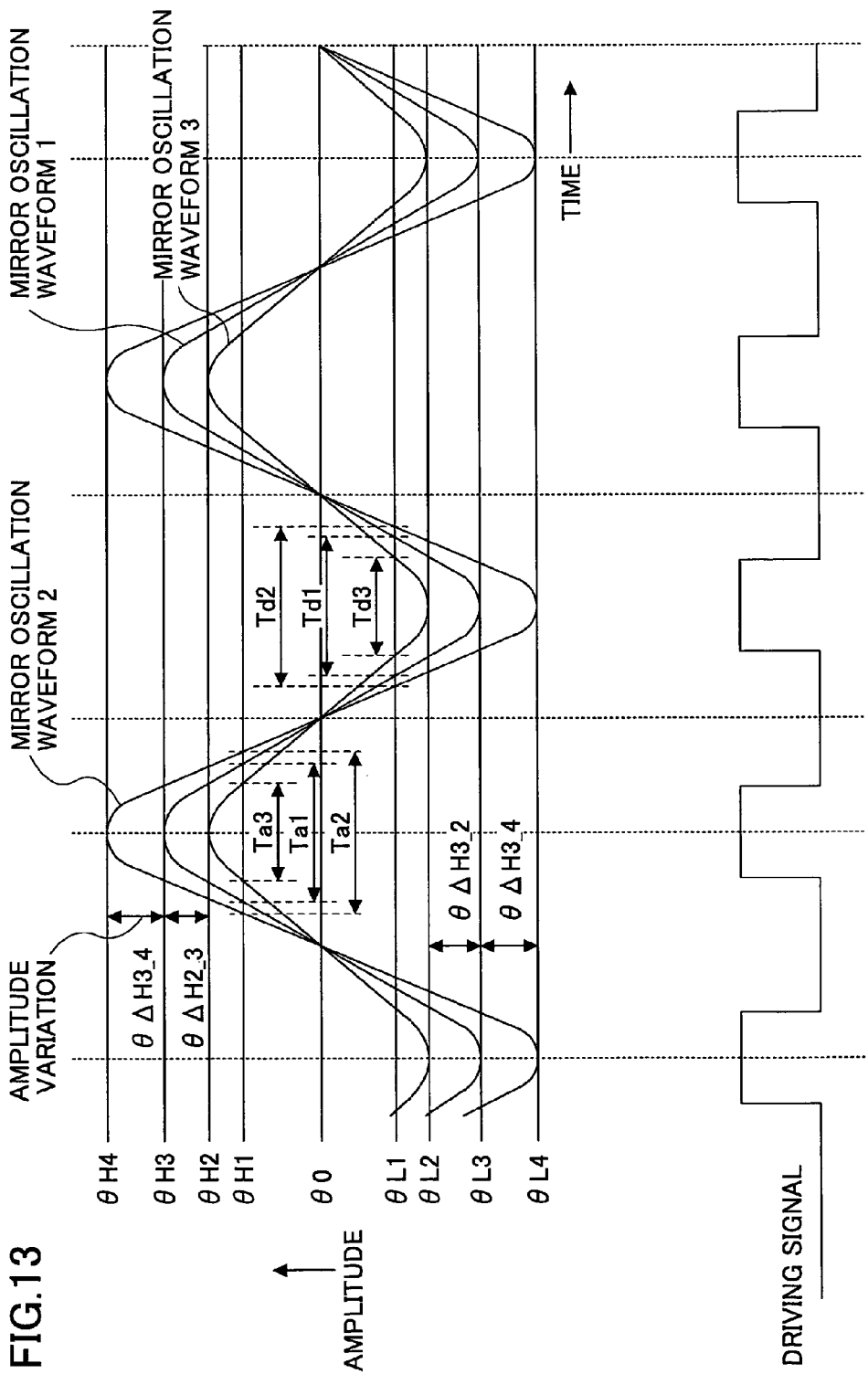
FIG. 13 illustrates examples of oscillation waveforms (oscillating trajectories) of the deflecting mirror and driving signals for forming an image from both directions with the optical scanning device according to an embodiment of the present invention.
Figure 14:
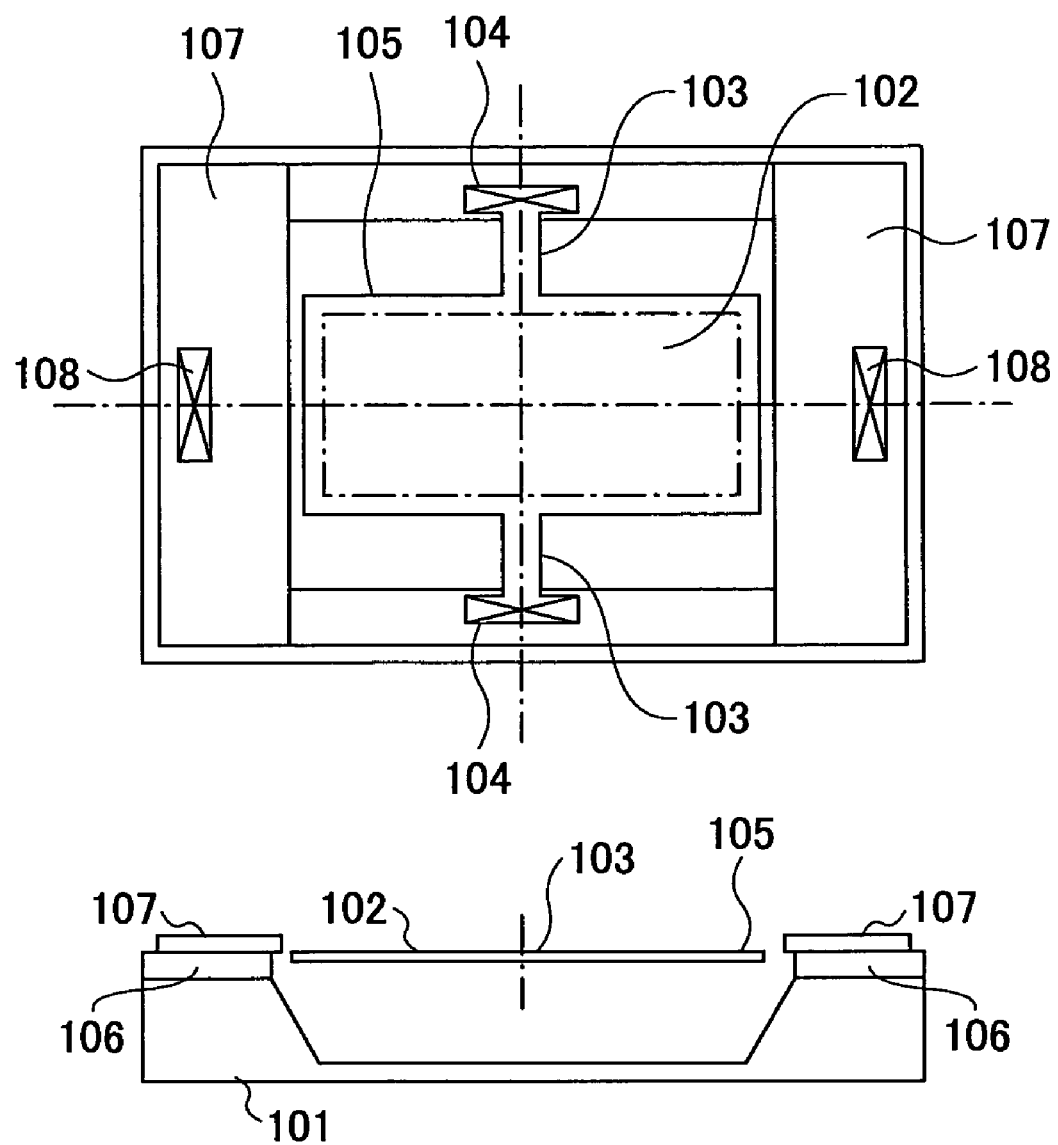
FIG. 14 shows a plan view and a cross-sectional view of an example of an oscillating mirror according to the conventional technology.

As shown in FIGS. 11 and 13, in the present embodiment, a reference point 1 and a reference point 2 are provided at arbitrary positions on both edges of the entire light beam scanning region that are away from the center part of the entire light beam scanning region. In the present embodiment, there is provided a light beam scanning time measuring unit (one of the detecting units (position detecting unit) 45 and the light beam scanning time measuring unit 46 shown in FIG. 5B) that measures, when the light beam is being reciprocally scanned, a time Ta from when the light beam passes the reference point 1 while being scanned in a forward direction, turns back in a backward direction at the end of the forward direction, until the light beam passes the reference point 1 while being scanned in the backward direction.

In the present embodiment, the control unit 42 can turn ON/OFF the light beam, in accordance with the measured light beam scanning time Ta, within an arbitrary time from the reference point 1 at the arbitrary position on one of the edge parts. Furthermore, the light beam can be cyclically and repeatedly turned ON/OFF within the arbitrary time.

Furthermore, when forming an image on the image carrier 60 with the deflecting mirror 40 by turning ON/OFF the light beam, the timing of starting to turn ON/OFF the light beam is adjusted according to the scanning time from the reference point 1.

Moreover, in the present embodiment, there is provided a light beam scanning time measuring unit (the other one of the detecting units (position detecting unit) 45 and the light beam scanning time measuring unit 46 shown in FIG. 5B) that measures, when the light beam is being reciprocally scanned, a time Td from when the light beam passes the reference point 2 while being scanned in a backward direction, turns back in a forward direction at the end of the backward direction, until the light beam passes the reference point 2 while being scanned in the forward direction.

In the present embodiment, the control unit 42 can turn ON/OFF the light beam, in accordance with the measured light beam scanning time Td, within an arbitrary time from the reference point 2 at the arbitrary position on one of the edge parts. Furthermore, the light beam can be cyclically and repeatedly turned ON/OFF within the arbitrary time.

Furthermore, when forming an image on the image carrier 60 with the deflecting mirror 40 by turning ON/OFF the light beam, the timing of starting to turn ON/OFF the light beam is adjusted according to the scanning time from the reference point 2.

As described above, when an image is formed on the image carrier 60 while the light beam is being reciprocally scanned, the number of times of turning ON/OFF the light beam in a particular optical scanning range L is calculated based on the density of pixels formed in the particular optical scanning range L. For example, assuming that the pixel density is M dpi (dots per inch), the total number of pixels is L×M. The distance between adjacent pixels is 1/M inch. In order to prevent the image quality from degrading, the variation in the distance between pixels needs to be less than or equal to ½ pixel. In order to mitigate the variation in the distance between pixels, it is necessary to mitigate the variation in the timings of turning ON/OFF the light beam.

As described above, the variation in the position of starting to turn ON/OFF the light beam or the variation in the timing of turning ON/OFF the light beam is likely to be caused by the variation in the oscillation amplitude of the deflecting mirror 40. However, by measuring and managing the variation value of the oscillation amplitude, it is possible to adjust, in accordance with the variation, the timings at which the light beam is turned ON/OFF and the timing of starting to turn ON/OFF the light beam, thereby mitigating degraded image quality even when the light beam is reciprocally scanned to form an image.

Sixth Embodiment

Next, a description is given of a sixth embodiment of the present invention.

Figure 12:
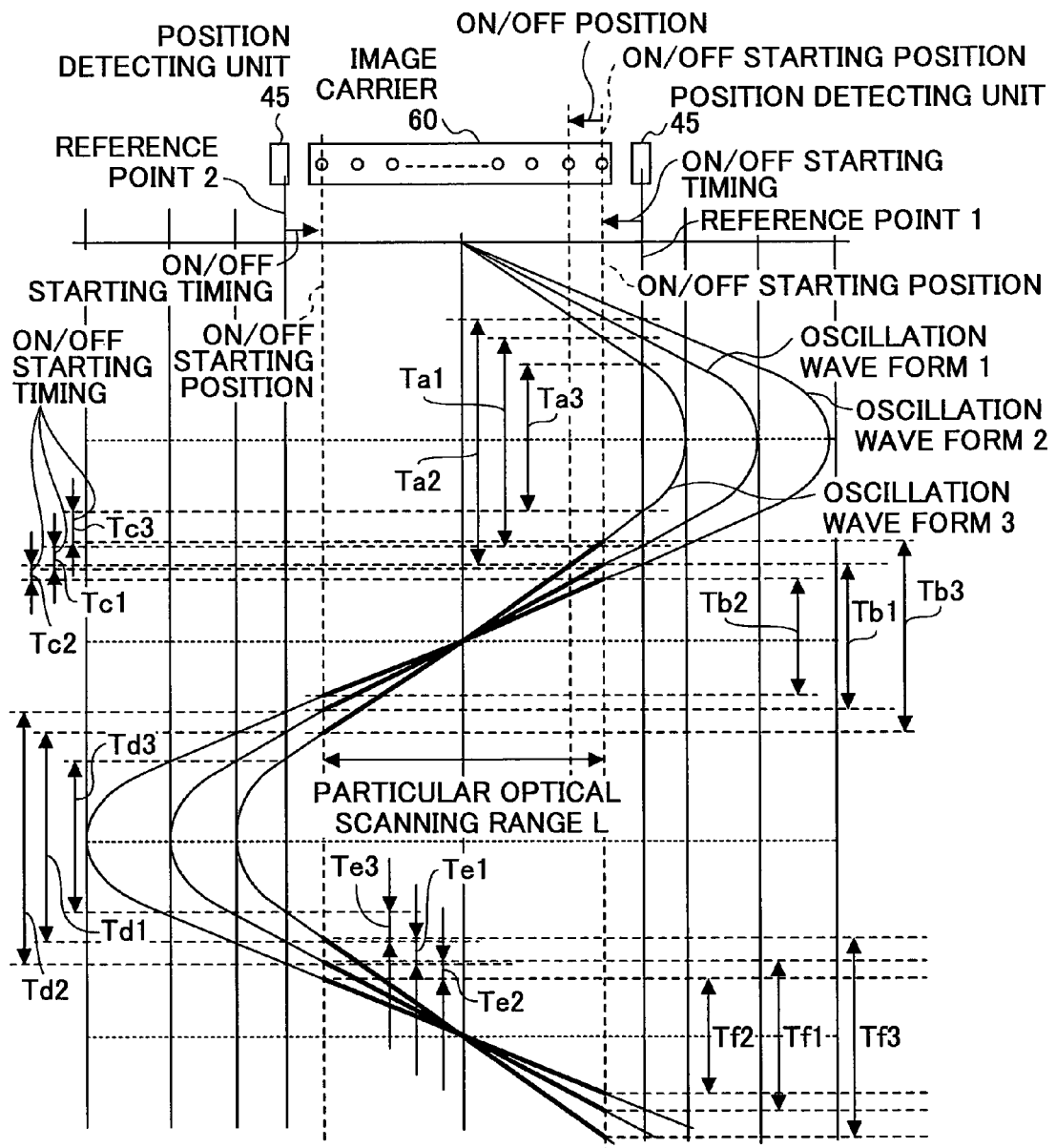
FIG. 12 illustrates an example of timings of starting to turn ON/OFF the light beam and times according to variations in the oscillation amplitude of the deflecting mirror when forming images from both directions with the optical scanning device according to an embodiment of the present invention.

FIG. 12 illustrates a mechanism of the variation in the timing of starting to turn ON/OFF the light beam caused by the variation in the oscillating amplitude of the deflecting mirror. In the following, a description is given of a method of adjusting the timing of starting to turn ON/OFF the light beam according to an embodiment of the present invention.

With regard to the oscillation waveform 1 shown in FIG. 12, when the time taken for the light beam to be reciprocally scanned is a measurement time Ta1 which is measured by the position detecting unit 45 at the reference point 1, the light beam starts to be turned ON/OFF at a timing Tc1 at the light beam ON/OFF starting position. Tc1 is obtained from Ta1, and Tc1 is uniquely defined with t=Ta1.

Next, a description is given of a case where the oscillation waveform 1 changes to the state of the oscillation waveform 2.

With regard to the oscillation waveform 2 shown in FIG. 12, when the time taken for the light beam to be reciprocally scanned is a measurement time Ta2 which is measured by the position detecting unit 45 at the reference point 1, the light beam starts to be turned ON/OFF at a timing Tc2 at the light beam ON/OFF starting position. Tc2 is obtained from Ta2, and Tc2 is uniquely defined with t=Ta2.

Also in a case where the oscillation waveform 1 changes to the state of the oscillation waveform 3, Tc3 is uniquely defined in the same manner.

Next, with regard to the oscillation waveform 1 shown in FIG. 12, when the time taken for the light beam to be reciprocally scanned is a measurement time Td1 which is measured by the position detecting unit 45 at the reference point 2, the light beam starts to be turned ON/OFF at a timing Te1 at the light beam ON/OFF starting position. Te1 is obtained from Td1, and Te1 is uniquely defined with t=Td1.

Next, a description is given of a case where the oscillation waveform 1 changes to the state of the oscillation waveform 2.

With regard to the oscillation waveform 2 shown in FIG. 12, when the time taken for the light beam to be reciprocally scanned is a measurement time Td2 which is measured by the position detecting unit 45 at the reference point 2, the light beam starts to be turned ON/OFF at a timing Te2 at the light beam ON/OFF starting position. Te2 is obtained from Td2, and Te2 is uniquely defined with t=Td2.

Also in a case where the oscillation waveform 1 changes to the state of the oscillation waveform 3, Te3 is uniquely defined in the same manner.

As described above, even if the oscillation amplitude of the deflecting mirror varies, the scanning times when the light beam passes the reference points 1 and 2 in reciprocal scanning are measured, and based on the scanning times, the timing of starting to turn ON/OFF the light beam is determined. Accordingly, positional displacement of the first pixel is prevented from both directions, thereby mitigating the image quality from being degraded.

Seventh Embodiment

Next, a description is given of a seventh embodiment of the present invention. A description is given of another method of adjusting the timing of turning ON/OFF the light beam according to an embodiment of the present invention.

With regard to the oscillation waveform 1 shown in FIG. 12, when the time taken for the light beam to be reciprocally scanned is a measurement time Ta1 which is measured by the position detecting unit 45 at the reference point 1, Tb1 is an overall time of the light beam ON/OFF cycles of the total number of pixels M×L corresponding to a pixel density M (dpi) in a particular optical scanning range L. In this case, the cycle TGR1 between adjacent pixels is obtained by the following formula.

$$TGR1=Tb1/(M\times L)[\sec]$$

When the light beam is turned ON/OFF in accordance with pixels generated in these cycles, the obtained image will have uniform distances between the pixels. The relationship between Tb1 and TGR1 is expressed by the following formula for Tb1.

$$Tb1=Tx(t)TGR1=Tx(t)$$

Furthermore, Tb1 and TGR1 are uniquely defined with t=Ta1.

Next, a description is given of a case where the oscillation waveform 1 changes to the state of the oscillation waveform 2.

With regard to the oscillation waveform 2 shown in FIG. 12, when the time taken for the light beam to be reciprocally scanned is a measurement time Td2 which is measured by the position detecting unit 45 at the reference point 1, Tb2 is an overall time of the light beam ON/OFF cycles of the total number of pixels M×L corresponding to a pixel density M (dpi) in a particular optical scanning range L. In this case, the cycle TGR2 between adjacent pixels is obtained by the following formula.

$$TGR2=Tb2/(M\times L)[\sec]$$

When the light beam is turned ON/OFF in accordance with pixels generated in these cycles, the obtained image will have uniform distances between the pixels. The relationship between Tb2 and TGR2 is expressed by the following formula for Tb2.

$$Tb2=Tx(t)TGR2=Tx(t)$$

Furthermore, Tb2 and TGR2 are uniquely defined with t=Ta2.

Also in a case where the oscillation waveform 1 changes to the state of the oscillation waveform 3, Tb3 and TGR3 are uniquely defined in the same manner.

With regard to the oscillation waveform 1 shown in FIG. 12, when the time taken for the light beam to be reciprocally scanned is a measurement time Td1 which is measured by the position detecting unit 45 at the reference point 2, Tf1 is an overall time of the light beam ON/OFF cycles of the total number of pixels M×L corresponding to a pixel density M (dpi) in a particular optical scanning range L. In this case, the cycle TGL1 between adjacent pixels is obtained by the following formula.

$$TGL1=Tf1/(M\times L)[\sec]$$

When the light beam is turned ON/OFF in accordance with pixels generated in these cycles, the obtained image will have uniform distances between the pixels. Tf1 and TGL1 are obtained from Td1, and Tf1 and TGL1 are uniquely defined with t=Td1.

Next, a description is given of a case where the oscillation waveform 1 changes to the state of the oscillation waveform 2.

With regard to the oscillation waveform 2 shown in FIG. 12, when the time taken for the light beam to be reciprocally scanned is a measurement time Td2 which is measured by the position detecting unit 45 at the reference point 2, Tf2 is an overall time of the light beam ON/OFF cycles of the total number of pixels M×L corresponding to a pixel density M (dpi) in a particular optical scanning range L. In this case, the cycle TGL2 between adjacent pixels is obtained by the following formula.

$$TGL2=Tf2/(M\times L)[\sec]$$

When the light beam is turned ON/OFF in accordance with pixels generated in these cycles, the obtained image will have uniform distances between the pixels. Tf2 and TGL2 are obtained from Td2, and Tf2 and TGL2 are uniquely defined with t=Td2.

Also in a case where the oscillation waveform 1 changes to the state of the oscillation waveform 3, Tf3 and TGL3 are uniquely defined in the same manner.

As described above, even if the oscillation amplitude of the deflecting mirror varies, the scanning times when the light beam passes the reference points 1 and 2 in reciprocal scanning are measured, and based on the scanning times, the timing of starting to turn ON/OFF the light beam is determined. Accordingly, positional displacement of the first pixel is prevented from both directions, thereby mitigating the image quality from being degraded.

Eighth Embodiment

Next, a description is given of an eighth embodiment of the present invention.

In the seventh embodiment, a description is given of a method of adjusting the timing of the cycle of turning ON/OFF the light beam in such a manner that the distances between adjacent pixels are uniform in the particular optical scanning range L, even when the oscillation of the deflecting mirror varies. In the following, a description is given of a method of further mitigating the image quality from degrading.

As illustrated in FIG. 12, the cycles of turning ON/OFF the light beam TGR1, TGR2, and TGR3 can be adjusted in accordance with the scanning times Ta1, Ta2, and Ta3, and the cycles of turning ON/OFF the light beam TGL1, TGL2, and TGL3 can be adjusted in accordance with the measurement times (scanning times) Td1, Td2, and Td3, respectively. When the ON time of the light beam in one cycle is fixed, the light beam irradiation energy will change when forming pixels on the image carrier. FIG. 10B illustrates a case where the light beam ON times are different according to the scanning time; however, this will cause inconsistencies in the density among pixels, which leads to degraded image quality.

Therefore, in the present embodiment, as shown in FIGS. 9A and 9B, when forming an image on an image carrier, the light beam irradiation energy for radiating a light beam onto an image carrier to form an image is adjusted in accordance with the scanning time Ta, in order to achieve a uniform pixel density. As a means for adjusting the light beam irradiation energy, there is a method of adjusting the ON time in the light beam ON/OFF as shown in "light beam ON/OFF a through c" illustrated in FIG. 9B. As another means, there is a method of adjusting the ON level in the light beam ON/OFF as shown in "light beam ON/OFF d through f" illustrated in FIG. 9B. Yet another effective method is to combine both of these means.

As described above, an embodiment of the present invention realizes an optical scanning device capable of controlling the image formation on an image carrier in accordance with oscillation variations of a deflecting mirror, thereby mitigating degraded image quality even when the oscillation variations of the deflecting mirror occur. Particularly, by using the optical scanning device according to an embodiment of the present invention in the color image forming apparatus as shown in FIG. 15, favorable color images can be formed.

In the embodiments illustrated in the diagrams, the optical scanning device according to the present invention is used as a latent image writing device in an image forming apparatus; however, the optical scanning device according to an embodiment of the present invention is also applicable to other optical equipment such as barcode readers and display devices (scanning type image display device).

According to one embodiment of the present invention, there is provided an optical scanning device including a light beam generating unit configured to generate a light beam; a light beam deflecting unit configured to receive the light beam and deflect/emit the light beam with a deflecting mirror; a light beam ON/OFF control unit configured to control the light beam generating unit so that the light beam deflected by the light beam deflecting unit is turned ON/OFF in a particular optical scanning range while the light beam is being reciprocally scanned; and a light beam scanning time measuring unit configured to obtain a measurement value by measuring a time or time intervals at which the light beam passes a reference point while being reciprocally scanned, the reference point being provided at an arbitrary position on an edge part of an entire light beam scanning region that is away from a center part of the entire light beam scanning region, wherein timings at which the light beam is turned ON/OFF are controlled in accordance with the measurement value. Therefore, even when oscillating variations occur in the deflecting mirror, degradation of image quality can be mitigated by controlling image formation on an image carrier in accordance with the oscillating variations.

Additionally, according to one embodiment of the present invention, the light beam scanning time measuring unit obtains the measurement value by measuring a light beam scanning time Ta from when the light beam passes the reference point while being scanned in a forward direction, turns back in a backward direction at the end of the forward direction, until the light beam passes the reference point while being scanned in the backward direction; and the light beam can start to be turned ON/OFF, in accordance with the obtained light beam scanning time Ta, within an arbitrary time from the reference point at the arbitrary position on the edge part.

Additionally, according to one embodiment of the present invention, the light beam can be repeatedly turned ON/OFF within the arbitrary time by an arbitrary time cycle. Therefore, even when oscillating variations occur in the deflecting mirror, degradation of image quality can be mitigated by controlling image formation on an image carrier in accordance with the oscillating variations.

Additionally, according to one embodiment of the present invention, the light beam ON/OFF control unit can arbitrarily determine when to start turning ON/OFF the light beam by adjusting an elapsed time from the reference point at the arbitrary position on the edge part. Therefore, when forming an image on an image carrier, the position at which the first pixel is formed is prevented from being displaced in the sub scanning direction, so that degradation of image quality can be mitigated.

Additionally, according to one embodiment of the present invention, when the light beam is cyclically and repeatedly turned ON/OFF within the arbitrary time, the light beam is turned ON/OFF at the same timings as timings at which the light beam passes a distance of (L/N), wherein L corresponds to the particular optical scanning range which is equally-divided by N. Therefore, when forming an image on an image carrier, even when oscillating variations occur in the deflecting mirror, pixels can be formed at constant intervals in the main scanning direction, so that degradation of image quality can be mitigated in the main scanning direction.

Additionally, according to one embodiment of the present invention, the light beam ON/OFF control unit can arbitrarily adjust a time during which the light beam is turned ON and a time during which the light beam is turned OFF. Therefore, by controlling the timings of turning ON/OFF the light beam, it is possible to address the problem that the light beam irradiation energy changes when forming pixels on the image carrier which leads to inconsistencies in the density among pixels, so that even when the oscillating amplitude varies in the deflecting mirror, the light beam irradiation energy can be stabilized when forming pixels.

Additionally, according to one embodiment of the present invention, a reference point 1 is provided at a first arbitrary position on a first edge part and a reference point 2 is provided at a second arbitrary position on a second edge part, the first edge part and the second edge part each being on either edge of the entire light beam scanning region away from the center part of the entire light beam scanning region; the light beam scanning time measuring unit obtains the measurement value by measuring, when the light beam is being reciprocally scanned, a light beam scanning time Ta from when the light beam passes the reference point 1 while being scanned in a forward direction, turns back in a backward direction at the end of the forward direction, until the light beam passes the reference point 1 while being scanned in the backward direction; the light beam can start to be turned ON/OFF, in accordance with the obtained light beam scanning time Ta, within a first arbitrary time from the reference point 1 at the first arbitrary position on the first edge part; and the light beam can be cyclically and repeatedly turned ON/OFF within the first arbitrary time.

Additionally, according to one embodiment of the present invention, the light beam scanning time measuring unit obtains the measurement value by measuring a light beam scanning time Td from when the light beam passes the reference point 2 while being scanned in the backward direction, turns back in the forward direction at the end of the backward direction, until the light beam passes the reference point 2 while being scanned in the forward direction; the light beam can start to be turned ON/OFF, in accordance with the obtained light beam scanning time Td, within a second arbitrary time from the reference point 2 at the second arbitrary position on the second edge part; and the light beam can be cyclically and repeatedly turned ON/OFF within the second arbitrary time. Therefore, while performing double-side image formation, even when oscillating variations occur in the deflecting mirror, degradation of image quality can be mitigated by controlling image formation on an image carrier in accordance with the oscillating variations.

Additionally, according to one embodiment of the present invention, the light beam ON/OFF control unit can arbitrarily determine when to start turning ON/OFF the light beam by adjusting an elapsed time from the reference point 1 at the first arbitrary position on the first edge part; and the light beam ON/OFF control unit can arbitrarily determine when to start turning ON/OFF the light beam by adjusting an elapsed time from the reference point 2 at the second arbitrary position on the second edge part. Therefore, when forming an image on an image carrier from both directions, the position at which the first pixel is formed is prevented from being displaced in the sub scanning direction, so that degradation of image quality can be mitigated.

Additionally, according to one embodiment of the present invention, when the light beam is cyclically and repeatedly turned ON/OFF within the first arbitrary time, the light beam is turned ON/OFF at the same timings as timings at which the light beam passes a distance of (L/N), wherein L corresponds to the particular optical scanning range which is equally-divided by N. Therefore, when forming an image on an image carrier from both directions, even when oscillating variations occur in the deflecting mirror, pixels can be formed at constant intervals in the main scanning direction, so that degradation of image quality can be mitigated in the main scanning direction.

Additionally, according to one embodiment of the present invention, the light beam ON/OFF control unit can arbitrarily adjust a time during which the light beam is turned ON and a time during which the light beam is turned OFF. Therefore, by controlling the timings of turning ON/OFF the light beam, it is possible to address the problem that the light beam irradiation energy changes when forming pixels on the image carrier which leads to inconsistencies in the density among pixels, so that when performing double-side image formation, even when the oscillating amplitude varies in the deflecting mirror, the light beam irradiation energy can be stabilized when forming pixels.

Additionally, according to one embodiment of the present invention, there is provided an image forming apparatus for performing image formation by forming a latent image on an image carrier by scanning a light beam with an optical scanning device and developing the latent image on the image carrier into a visible image, wherein the optical scanning device includes a light beam generating unit configured to generate a light beam; a light beam deflecting unit configured to receive the light beam and deflect/emit the light beam with a deflecting mirror; a light beam ON/OFF control unit configured to control the light beam generating unit so that the light beam deflected by the light beam deflecting unit is turned ON/OFF in a particular optical scanning range while the light beam is being reciprocally scanned; and a light beam scanning time measuring unit configured to obtain a measurement value by measuring a time or time intervals at which the light beam passes a reference point while being reciprocally scanned, the reference point being provided at an arbitrary position on an edge part of an entire light beam scanning region that is away from a center part of the entire light beam scanning region, wherein timings at which the light beam is turned ON/OFF are controlled in accordance with the measurement value. Therefore, even when oscillating variations occur in the deflecting mirror, degradation of image quality can be mitigated by controlling image formation on an image carrier in accordance with the oscillating variations.

The present invention is not limited to the specifically disclosed embodiment, and variations and expansions may be made without departing from the scope of the present invention.

The present application is based on Japanese Priority Patent Application No. 2007-236274, filed on Sep. 12, 2007, the entire contents of which are hereby incorporated by reference.

The invention claimed is:

1. An optical scanning device comprising:
    a light beam generating unit configured to generate a light beam;
    a light beam deflecting unit configured to receive the light beam and deflect/emit the light beam with a deflecting mirror;
    a light beam ON/OFF control unit configured to control the light beam generating unit so that the light beam deflected by the light beam deflecting unit is turned ON/OFF in a particular optical scanning range while the light beam is being reciprocally scanned; and
    a light beam scanning time measuring unit configured to obtain a measurement value by measuring a time or time intervals at which the light beam passes a reference point while being reciprocally scanned, the reference point being provided at an arbitrary position on an edge part of an entire light beam scanning region that is away from a center part of the entire light beam scanning region, wherein:
    timings at which the light beam is turned ON/OFF are controlled in accordance with the measurement value.

2. The optical scanning device according to claim 1, wherein:
    the light beam scanning time measuring unit obtains the measurement value by measuring a light beam scanning time Ta from when the light beam passes the reference point while being scanned in a forward direction, turns back in a backward direction at the end of the forward direction, until the light beam passes the reference point while being scanned in the backward direction; and
    the light beam can start to be turned ON/OFF, in accordance with the obtained light beam scanning time Ta, within an arbitrary time from the reference point at the arbitrary position on the edge part.

3. The optical scanning device according to claim 2, wherein:
    the light beam can be repeatedly turned ON/OFF within the arbitrary time by an arbitrary time cycle.

4. The optical scanning device according to claim 2, wherein:
the light beam ON/OFF control unit can arbitrarily determine when to start turning ON/OFF the light beam by adjusting an elapsed time from the reference point at the arbitrary position on the edge part.

5. The optical scanning device according to claim 3, wherein:
when the light beam is cyclically and repeatedly turned ON/OFF within the arbitrary time, the light beam is turned ON/OFF at the same timings as timings at which the light beam passes a distance of (L/N), wherein L corresponds to the particular optical scanning range which is equally-divided by N.

6. The optical scanning device according to claim 5, wherein:
the light beam ON/OFF control unit can arbitrarily adjust a time during which the light beam is turned ON and a time during which the light beam is turned OFF.

7. The optical scanning device according to claim 1, wherein:
a reference point 1 is provided at a first arbitrary position on a first edge part and a reference point 2 is provided at a second arbitrary position on a second edge part, the first edge part and the second edge part each being on either edge of the entire light beam scanning region away from the center part of the entire light beam scanning region;
the light beam scanning time measuring unit obtains the measurement value by measuring, when the light beam is being reciprocally scanned, a light beam scanning time Ta from when the light beam passes the reference point 1 while being scanned in a forward direction, turns back in a backward direction at the end of the forward direction, until the light beam passes the reference point 1 while being scanned in the backward direction;
the light beam can start to be turned ON/OFF, in accordance with the obtained light beam scanning time Ta, within a first arbitrary time from the reference point 1 at the first arbitrary position on the first edge part; and
the light beam can be cyclically and repeatedly turned ON/OFF within the first arbitrary time.

8. The optical scanning device according to claim 7, wherein:
the light beam scanning time measuring unit obtains the measurement value by measuring a light beam scanning time Td from when the light beam passes the reference point 2 while being scanned in the backward direction, turns back in the forward direction at the end of the backward direction, until the light beam passes the reference point 2 while being scanned in the forward direction;
the light beam can start to be turned ON/OFF, in accordance with the obtained light beam scanning time Td, within a second arbitrary time from the reference point 2 at the second arbitrary position on the second edge part; and
the light beam can be cyclically and repeatedly turned ON/OFF within the second arbitrary time.

9. The optical scanning device according to claim 7, wherein:
the light beam ON/OFF control unit can arbitrarily determine when to start turning ON/OFF the light beam by adjusting an elapsed time from the reference point 1 at the first arbitrary position on the first edge part.

10. The optical scanning device according to claim 7, wherein:
when the light beam is cyclically and repeatedly turned ON/OFF within the first arbitrary time, the light beam is turned ON/OFF at the same timings as timings at which the light beam passes a distance of (L/N), wherein L corresponds to the particular optical scanning range which is equally-divided by N.

11. The optical scanning device according to claim 10, wherein:
the light beam ON/OFF control unit can arbitrarily adjust a time during which the light beam is turned ON and a time during which the light beam is turned OFF.

12. An image forming apparatus for performing image formation by forming a latent image on an image carrier by scanning a light beam with an optical scanning device and developing the latent image on the image carrier into a visible image, wherein the optical scanning device comprises:
a light beam generating unit configured to generate a light beam;
a light beam deflecting unit configured to receive the light beam and deflect/emit the light beam with a deflecting mirror;
a light beam ON/OFF control unit configured to control the light beam generating unit so that the light beam deflected by the light beam deflecting unit is turned ON/OFF in a particular optical scanning range while the light beam is being reciprocally scanned; and
a light beam scanning time measuring unit configured to obtain a measurement value by measuring a time or time intervals at which the light beam passes a reference point while being reciprocally scanned, the reference point being provided at an arbitrary position on an edge part of an entire light beam scanning region that is away from a center part of the entire light beam scanning region, wherein:
timings at which the light beam is turned ON/OFF are controlled in accordance with the measurement value.

* * * * *